United States Patent
Perneti et al.

(10) Patent No.: US 11,409,453 B2
(45) Date of Patent: Aug. 9, 2022

(54) STORAGE CAPACITY FORECASTING FOR STORAGE SYSTEMS IN AN ACTIVE TIER OF A STORAGE ENVIRONMENT

(71) Applicant: Dell Products L.P., Round Rock, TX (US)

(72) Inventors: Jayanth Kumar Reddy Perneti, Bangalore (IN); Vindhya Gangaraju, Davanagere (IN)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 17/027,813

(22) Filed: Sep. 22, 2020

(65) Prior Publication Data

US 2022/0091763 A1 Mar. 24, 2022

(51) Int. Cl.
*G06F 3/06* (2006.01)
*G06N 7/02* (2006.01)

(52) U.S. Cl.
CPC .......... *G06F 3/0638* (2013.01); *G06F 3/0604* (2013.01); *G06F 3/0679* (2013.01); *G06N 7/02* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;

(Continued)

(56) References Cited

U.S. PATENT DOCUMENTS 10,152,239 B1 * 12/2018 Tamilmani ............ G06F 3/067
2003/0065898 A1 * 4/2003 Flamma ................ G06F 16/93
711/165

(Continued)

OTHER PUBLICATIONS

R. Jia, Y. Yang, J. Grundy, J. Keung and H. Li, "A Highly Efficient Data Locality Aware Task Scheduler for Cloud-Based Systems," 2019 IEEE 12th International Conference on Cloud Computing (CLOUD), 2019, pp. 496-498, doi: 10.1109/CLOUD.2019.00089. (Year: 2019).*

(Continued)

*Primary Examiner* — Daniel C. Chappell
(74) *Attorney, Agent, or Firm* — Ryan, Mason & Lewis, LLP

(57) ABSTRACT

An apparatus comprises at least one processing device configured to generate, for a storage system that is part of an active tier of a storage environment, at least one storage capacity forecast comprising probability values for storage capacity of the storage system over a designated time period. The processing device is also configured to determine whether any of the probability values exceed at least one designated storage capacity threshold and, responsive to determining that a given one of the probability values exceeds the at least one designated storage capacity threshold, to select remedial actions for freeing up space on the active tier of the storage environment. The processing device is further configured to initiate the selected remedial actions for freeing up space on the active tier of the storage environment to prevent the storage system from reaching a designated storage capacity error condition.

20 Claims, 19 Drawing Sheets

(58) Field of Classification Search
CPC ....... G06F 16/00–986; G06F 17/00–40; G06F
21/00–88; G06F 2009/3883; G06F
2009/45562–45595; G06F 2015/761–768;
G06F 2201/00–885; G06F 2206/00–20;
G06F 2209/00–549; G06F 2211/00–902;
G06F 2212/00–7211; G06F
2213/00–4004; G06F 2216/00–17; G06F
2221/00–2153; G06K 9/00–82; G06N
3/00–126; G06N 5/00–048; G06N
7/00–08; G06N 10/00; G06N 20/00–20;
G06N 99/00–007; G11B 20/00–24; G11B
33/00–1493; G11C 7/00–24; G11C
11/00–5692; G11C 13/00–06; G11C
14/00–009; G11C 15/00–06; G11C
16/00–3495; G11C 17/00–18; G11C
2207/00–229; G11C 2216/00–30; H01L
25/00–50; H01L 27/00–3297; H01L
2225/00–1094; H04L 9/00–38; H04L
12/00–66; H04L 41/00–5096; H04L
49/00–9094; H04L 61/00–6095; H04L
67/00–42
See application file for complete search history.

(56) References Cited

U.S. PATENT DOCUMENTS

| | | | | |
|---|---|---|---|---|
| 2007/0083482 | A1* | 4/2007 | Rathi | G06F 3/048 |
| 2007/0245116 | A1* | 10/2007 | Yamamoto | G06F 3/0665 |
| | | | | 711/172 |
| 2008/0243870 | A1* | 10/2008 | Muller | G06F 3/0686 |
| 2013/0204963 | A1* | 8/2013 | Boss | G06F 3/0649 |
| | | | | 709/217 |
| 2014/0310714 | A1* | 10/2014 | Chan | G06F 16/285 |
| | | | | 718/102 |
| 2017/0123709 | A1* | 5/2017 | Kotadia | G06F 3/0638 |
| 2017/0185605 | A1* | 6/2017 | Higuchi | G06F 3/067 |
| 2020/0026454 | A1* | 1/2020 | Iikura | G06F 9/4856 |
| 2020/0225863 | A1* | 7/2020 | Veluswamy | G06F 3/0647 |
| 2021/0389894 | A1* | 12/2021 | Zhou | G06F 9/45558 |
| 2022/0019554 | A1* | 1/2022 | Trout | G06F 16/182 |
| 2022/0091763 | A1* | 3/2022 | Perneti | G06F 3/0679 |

OTHER PUBLICATIONS

Dell Inc. "Dell EMC Avamar," Administration Guide. 19.2, Rev. 04, Jun. 2020, 328 pages.
Dell EMC, "Introduction to Dell EMC XtremIO X2 Storage Array," White Paper, Nov. 2019, 59 pages.
Dell EMC, "Dell EMC PowerProtect DD Management Center," Version 7.1, Installation and Administration Guide, REV 02, Feb. 2020, 166 pages.
L. Adato, "Monitoring 101: A Primer to the Philosophy, Theory, and Fundamental Concepts Involved in Systems Monitoring," SolarWinds, 2019, 28 pages.
Dell EMC, "Deduplication Solutions Are Not All Created Equal, Why Data Domain?" 2017, 12 pages.
Dell EMC, "Dell EMC Data Domain Operating System," Version 6.1, Administration Guide, 302-003-761, REV. 05, Feb. 2019, 556 pages.
Nutanix, Inc., "Nutanix Prism," https://www.nutanix.com/viewer?type=pdf&path=/content/dam/nutanix/resources/datasheets/ds-prism.pdf, 2019, 2 pages.
P. Silva, "A Short Tutorial on Fuzzy Time Series—Part III," https://towardsdatascience.com/a-short-tutorial-on-fuzzy-time-series-part-iii-69445dff83fb, Apr. 4, 2019, 13 pages.
Oracle, "Demantra Demand Management," Oracle Value Chain Planning Data Sheet, 2015, 5 pages.
Hewlett-Packard Development Company, L.P., "HP Data Protector Software Performance," White Paper, 2007, 78 pages.
Hewlett Packard Enterprise Development L.P., "HPE Infosight Security for HPE Storage," Technical White Paper, Apr. 2020, 16 pages.

* cited by examiner

FIG. 7

```
Input: file_creation_time [ ], file_modification_time [ ]
Output: list_of_files [ ]
/* listing cold data files on system until date */
/* files = list of all the files present in Storage Backup System */
for file in files:
    /* c_time is file creation time and m_time is file modification time */
    if(c_time == m_time):
        out_list.append /* out_list is list of cold data files */
return out_list /* Case1: cold data older than user defined age threshold value */
/* file_age is the difference of current time and m_time */
for file in out_list:
    if((c_time == m_time) && (file_age > user_defined_age_threshold)):
        out_list_age.append
return out_list_age /* Case2: cold data in user defined age threshold range */
for file in out_list:
    if((c_time == m_time) && (file_age in range(min_age, max_age)):
        out_list_age_range.append
return out_list_age_range /* Case3: cold data in user defined file size and age threshold value */
for file in out_list:
    if((c_time == m_time) && (file_size == user_defined_size) && (file_age > user_defined_age_threshold)):
        out_list_age_size.append
return out_list_age_size
```

FIG. 8

STORAGE CAPACITY FORECASTING FOR STORAGE SYSTEMS IN AN ACTIVE TIER OF A STORAGE ENVIRONMENT

FIELD

The field relates generally to information processing, and more particularly to storage in information processing systems.

BACKGROUND

As the amount of data stored in a storage environment increases, the task of performing backups in the storage environment becomes more complex. Even with advanced backup management solutions in place, backup tasks may fail due to various errors. Such errors include, but are not limited to, network issues, misconfiguration of backup policies, unplanned downtime, and storage space issues. Storage space issues may be a result of unexpected consumption of available storage capacity in storage systems of a storage environment. Failure of backup tasks may impact reliability and disrupt operations of a storage environment.

SUMMARY

Illustrative embodiments of the present invention provide techniques for generating storage capacity forecasts for storage systems in an active tier of a storage environment, and for selecting and initiating remedial actions for preventing storage systems in the active tier of the storage environment from reaching designated storage capacity error conditions.

In one embodiment, an apparatus comprises at least one processing device comprising a processor coupled to a memory. The at least one processing device is configured to perform the steps of generating, for at least one storage system that is part of an active tier of a storage environment, at least one storage capacity forecast comprising probability values for storage capacity of the at least one storage system over a designated time period and determining whether any of the probability values for storage capacity of the at least one storage system over the designated time period exceed at least one designated storage capacity threshold. The at least one processing device is also configured to perform the step of, responsive to determining that a given one of the probability values for storage capacity of the at least one storage system over the designated time period exceeds the at least one designated storage capacity threshold, selecting one or more remedial actions for freeing up space on the active tier of the storage environment. The at least one processing device is further configured to perform the step of initiating the selected one or more remedial actions for freeing up space on the active tier of the storage environment to prevent the at least one storage system from reaching a designated storage capacity error condition.

These and other illustrative embodiments include, without limitation, methods, apparatus, networks, systems and processor-readable storage media.

BRIEF DESCRIPTION OF THE DRAWINGS

FIG. 7 shows an example interface for a rule generator of a storage backup system in an illustrative embodiment.

FIG. 8 shows an example of pseudocode for identifying cold data in a storage backup system in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
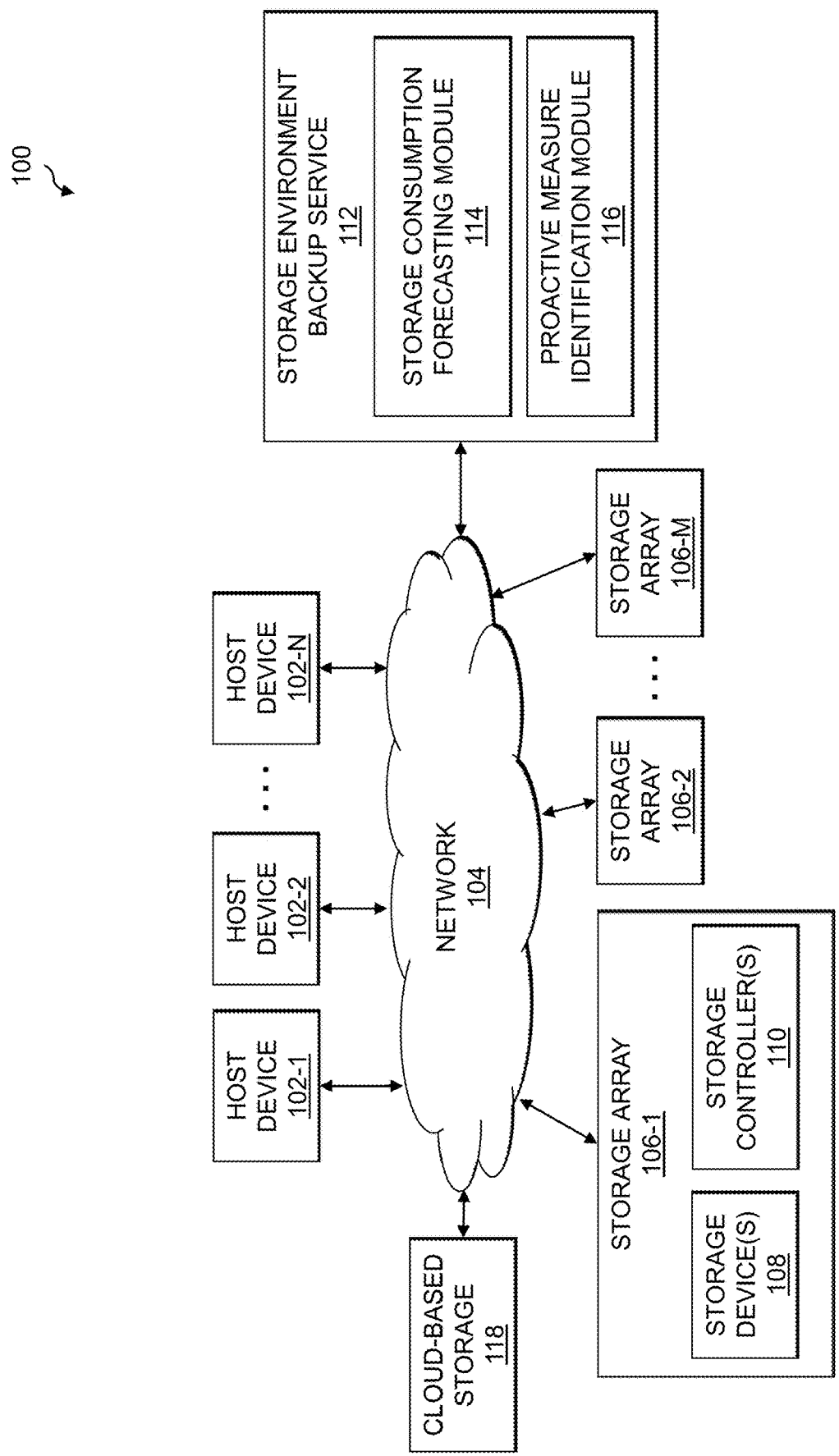
FIG. 1 is a block diagram of an information processing system for generating storage capacity forecasts for storage systems in an active tier of a storage environment in an illustrative embodiment of the invention.

FIG. 1 shows an information processing system 100 configured in accordance with an illustrative embodiment to generate storage capacity forecasts for storage systems in an active tier of a storage environment, and to select and initiate remedial actions for preventing storage systems in the active tier of the storage environment from reaching designated storage capacity error conditions. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "TO" should be understood to refer to input and/or output. Thus, an TO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to access one or more storage volumes provided by the storage arrays 106. Storage volumes provided by the storage devices of one or more of the storage arrays 106 may be grouped to provide one or more virtual volumes that are accessed by the host devices 102. The information processing system 100 further includes a storage environment backup service 112 that is configured to provide functionality for generating storage capacity forecasts for storage systems in an active tier of a storage environment, and for selecting and initiating remedial actions for preventing storage systems in the active tier of the storage environment from reaching designated storage capacity error conditions.

The storage environment backup service 112 includes a storage consumption forecasting module 114 and a proactive measure identification module 116. The storage environment backup service 112 is configured to counter "storage full" issues in storage backup systems (e.g., deduplication-based storage backup systems) by performing an n days ahead forecasting of storage consumption on the storage arrays 106, which are assumed to provide an active tier of the storage backup system. FIG. 1 also shows cloud-based storage 118, which may provide an inactive or cloud tier (also referred to as a backup tier) for the storage backup system. It should be appreciated, however, that in some embodiments the storage arrays 106 may themselves provide both an active and an inactive tier of the storage backup system. For example, a first subset of the storage arrays 106 (e.g., storage arrays 106-1 and 106-2) may provide the active tier while a second subset of the storage arrays 106 (e.g., storage arrays 106-3 through 106-N may provide the inactive or backup tier. In some cases, it is possible for the same set of storage arrays 106 to provide both the active and inactive or backup tier of a storage backup system. For example, a first subset of the storage devices 108 of storage array 106-1 may provide an active tier while a second subset of the storage devices 108 of the storage array 106-1 may provide an inactive or backup tier. Various other examples are possible. It should thus be appreciated that the term "active tier" as used herein is intended to be broadly construed. An active tier may comprise an active tier of a multi-tier storage system, an active part of a single-tier storage system, etc. It should further be appreciated that, within the active tier, different types of storage devices may be utilized.

In the FIG. 1 embodiment, the storage environment backup service 112 may utilize the storage consumption forecasting module 114 to perform the n days ahead forecasting of storage consumption (e.g., for each of the storage arrays 106, or storage devices 108 thereof, which form an active tier of a storage backup system). The storage consumption forecasting module 114 may, in some embodiments, utilize a Probabilistic Weighted Fuzzy Time Series (PWFTS) algorithm for such forecasting. Further, while various embodiments are described with respect to performing an n days ahead forecasting, it should be appreciated that various other time intervals may be used. For example, forecasting may be done for n minutes, hours, weeks, etc. or any other desired period of time including multiples thereof (e.g., every n two days, every n three days, etc.).

The storage environment backup service 112 is further configured to utilize the proactive measure identification module 116 to identify and automatically perform proactive measures in a storage backup system to counter potential issues (e.g., storage becoming full issues). The proactive measure identification module 116 may be configured to identify proactive measures to take, and then perform such proactive measures. The proactive measures may include generating and delivering notifications (e.g., to end-users at the host devices 102, to a storage administrator or other authorized user such as a sales team) that indicate which storage arrays 106 are predicted to become full, recommendations for deploying additional storage resources to such storage arrays 106 (e.g., adding new storage devices 108 thereto, replacing or upgrading existing storage devices 108), etc. The proactive measures may also include performing rule-based migration of "unique cold data" to free up space on an active tier of the storage arrays 106 that are part of the backup system. This may include moving data from the storage arrays 106 providing the active tier to cloud-based storage 118 on a cloud tier. The storage environment backup service 112 may implement adaptive policy-enforcing mechanisms (e.g., based on the predicted probability values of storage capacity as provided by PWFTS forecasting algorithms implemented by the storage consumption forecasting module 114) to perform automatic and dynamic resource allocation for data movement and garbage collection processes to free up space on the active tier as fast as possible. Such an approach advantageously helps in increased end-user satisfaction and trust.

The storage environment backup service 112 may be utilized in various different scenarios. For example, the storage environment backup service 112 may be implemented as part of a Data Domain management center (DDMC) or Data Domain system manager (DDSM) of a suitable modified Dell EMC Data Domain system or Dell EMC PowerProtect DD system or environment. This enables display of the storage consumption forecasting for better visualization of data growth, with the predicted storage capacity values being used to perform proactive measure to counter storage becoming full. The forecasted storage capacity values provided using the storage environment backup service and implemented within such systems may be displayed within a Dell EMC Avamar Management Console Graphical User Interface (MCGUI) or a Networker Management Center (NMC) for better visualization of data growth. The forecasted storage capacity values provided using the storage environment backup service 112 may also be displayed within an XtremIO Graphical User Interface (GUI), such as an XtremIO Management Server (XMS) GUI for better visualization of data growth.

In some embodiments, the storage environment backup service 112 is utilized by storage administrators or sales teams, which are notified when storage consumption reaches beyond designated threshold values. This helps the storage administrator or sales teams to proactively approach end-users to explain upcoming storage problems (e.g., storage becoming full) and to provide suggestions for preventing such storage problems, such as by deploying a new model of a storage backup system with latest features, expanding an existing storage backup system, virtual scale-out, performing data movement to cloud-based storage 118, etc.

At least portions of the functionality of the storage consumption forecasting module 114 and the proactive measure identification module 116 may be implemented at least in part in the form of software that is stored in memory and executed by a processor.

Although shown as external to the host devices 102 and storage arrays 106 in the FIG. 1 embodiment, it should be appreciated that the storage environment backup service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and storage environment backup service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the storage environment backup service 112 may be implemented on respective distinct processing platforms, although numerous other arrangements are possible. For example, in some embodiments at least portions of one or more of the host devices 102, the storage arrays 106 and the storage environment backup service 112 are implemented on the same processing platform. The storage environment backup service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement 10 operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the storage environment backup service 112 may be implemented at least in part in the first geographic location, the second geographic location, and one or more other geographic locations. Thus, it is possible in some implementations of the system 100 for different ones of the host devices 102, the storage arrays 106 and the storage environment backup service 112 to reside in different data centers.

Numerous other distributed implementations of the host devices 102, the storage array 106 and the storage environment backup service 112 are possible. Accordingly, the host devices 102, the storage array 106 and the storage environment backup service 112 can also be implemented in a distributed manner across multiple data centers.

Additional examples of processing platforms utilized to implement portions of the system 100 in illustrative embodiments will be described in more detail below in conjunction with FIGS. 12 and 13.

It is to be understood that the particular set of elements shown in FIG. 1 for generating storage capacity forecasts for storage systems in an active tier of a storage environment, and for selecting and initiating remedial actions for preventing storage systems in the active tier of the storage environment from reaching designated storage capacity error conditions is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
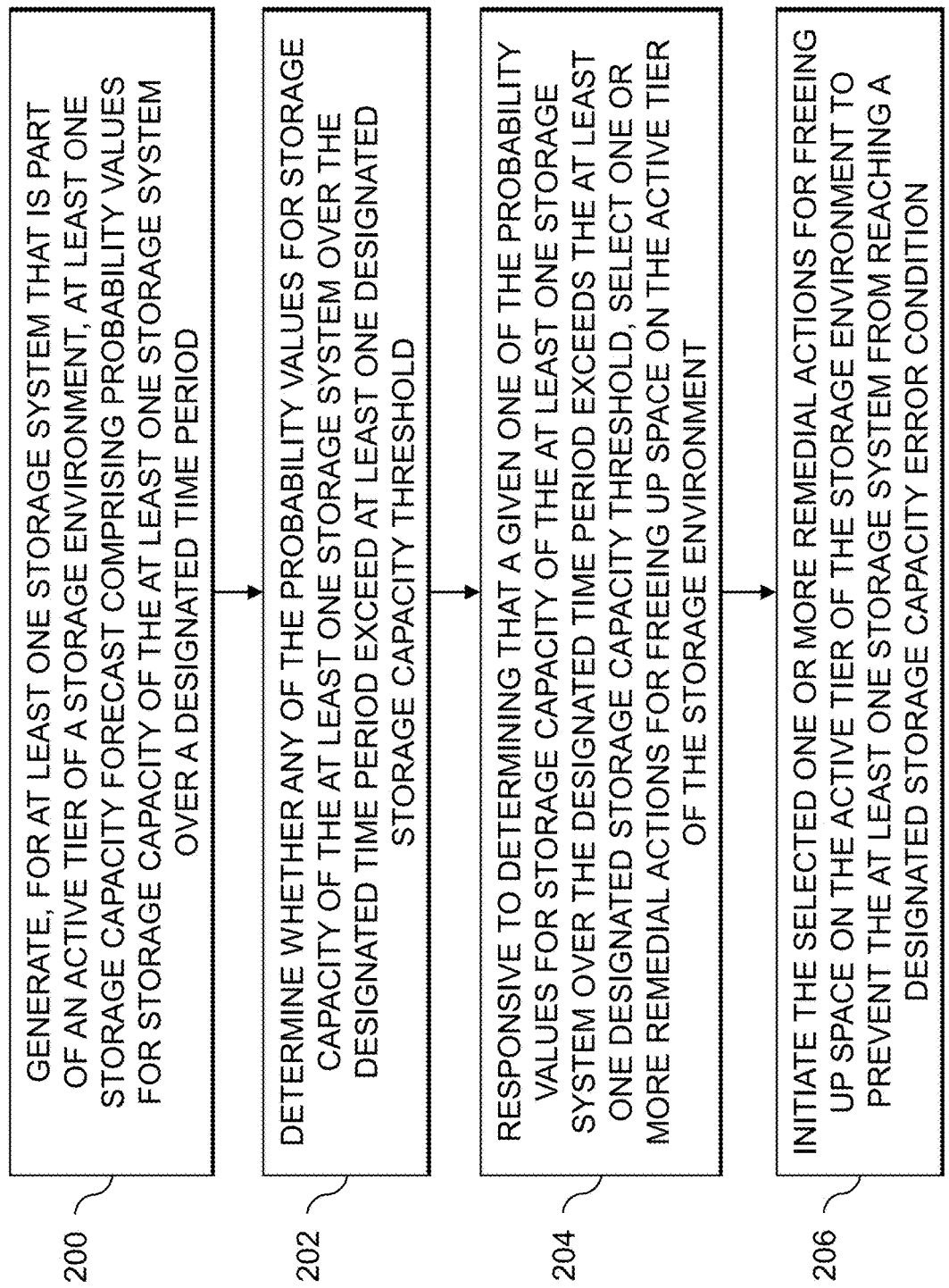
FIG. 2 is a flow diagram of an exemplary process for generating storage capacity forecasts for storage systems in an active tier of a storage environment in an illustrative embodiment.

An exemplary process for generating storage capacity forecasts for storage systems in an active tier of a storage environment, and for selecting and initiating remedial actions for preventing storage systems in the active tier of the storage environment from reaching designated storage capacity error conditions will now be described in more detail with reference to the flow diagram of FIG. 2. It is to be understood that this particular process is only an example, and that additional or alternative processes for generating storage capacity forecasts for storage systems in an active tier of a storage environment, and for selecting and initiating remedial actions for preventing storage systems in the active tier of the storage environment from reaching designated storage capacity error conditions may be used in other embodiments.

In this embodiment, the process includes steps 200 through 206. These steps are assumed to be performed by the storage environment backup service 112 utilizing the storage consumption forecasting module 114 and the proactive measure identification module 116. The process begins with step 200, generating, for at least one storage system that is part of an active tier of a storage environment, at least one storage capacity forecast comprising probability values for storage capacity of the at least one storage system over a designated time period. The storage environment may comprise a deduplication-based storage backup environment. Step 200 may comprise utilizing a Probabilistic Weighted Fuzzy Time Series (PWFTS) algorithm.

In step 202, a determination is made as to whether any of the probability values for storage capacity of the at least one storage system over the designated time period exceed at least one designated storage capacity threshold. Responsive to determining that a given one of the probability values for storage capacity of the at least one storage system over the designated time period exceeds the at least one designated storage capacity threshold, one or more remedial actions are selected in step 204 for freeing up space on the active tier of the storage environment. The selected one or more remedial actions for freeing up space on the active tier of the storage environment are initiated in step 206 to prevent the at least one storage system from reaching a designated storage capacity error condition.

In some embodiments, the at least one designated storage capacity threshold comprises a first storage capacity threshold associated with a first one of the one or more remedial actions and at least a second storage capacity threshold associated with a second one of the one or more remedial actions. The first remedial action associated with the first storage capacity threshold may comprise identifying and migrating a portion of data stored on the at least one storage system from the active tier of the storage environment to a cloud tier of the storage environment, and the second remedial action associated with the second storage capacity threshold may comprise overriding one or more garbage collection policies of the at least one storage system and initiating one or more garbage collection processes in the at least one storage system. The second storage capacity threshold may exceed the first storage capacity threshold.

The at least one designated storage capacity threshold may further comprise a third storage capacity threshold associated with a third one of the one or more remedial actions and a fourth storage capacity threshold associated with a fourth one of the one or more remedial actions. The third remedial action associated with the third storage capacity threshold may comprise generating and delivering a first notification to one or more end-users of the at least one storage system in the storage environment, and the fourth remedial action associated with the fourth storage capacity threshold may comprise generating and delivering a second notification to a storage administrator associated with the storage environment. The fourth storage capacity threshold may be less than the first storage capacity threshold, and the third storage capacity threshold may be less than the fourth storage capacity threshold. The first notification may comprise a predicted time at which the at least one storage system is expected to reach the designated storage capacity error condition, and the second notification may comprise a recommendation for deploying additional storage resources in the storage environment to prevent at least one storage system from reaching the designated storage capacity error condition.

The selected one or more remedial actions may comprise identifying portions of data stored in the at least one storage system that meet one or more usage-based selection criteria, and step 206 may comprise migrating the identified portions of data from the at least one storage system in the active tier of the storage environment to a cloud tier of the storage environment. The one or more usage-based selection criteria may comprise user-specified criteria relating to at least one of file size and file age. The one or more usage-based selection criteria may comprise user-specified criteria relating to one or more service level agreements for retention of designated data on the active tier of the storage environment. Identifying the portions of data stored in the at least one storage system that meet the one or more usage-based selection criteria may comprise selecting a subset of the data stored in the at least one storage system meeting the one or more usage-based selection, the selected subset of the data comprising unique files in the storage environment.

In some embodiments, the selected one or more remedial actions comprise data movement processes for migrating a portion of data stored on the at least one storage system from the active tier of the storage environment to a cloud tier of the storage environment, and step 206 may comprise dynamically assigning resources to the data movement processes based at least in part on the probability values for storage capacity of the at least one storage system over the designated time period. The selected one or more remedial actions may further or alternatively comprise garbage collection processes for deleting data stored in the at least one storage system in the active tier of the storage environment, and step 206 may comprise dynamically assigning resources to the garbage collection processes based at least in part on the probability values for storage capacity of the at least one storage system over the designated time period.

With geometric increase in the amount of data to be stored, storage backup systems must grow at a high scale and the task of performing backups becomes much more complex. Even in a finely-honed backup management solution, backup tasks may fail due to problems such as network issues, misconfigurations (e.g., in backup policies), unplanned downtimes, storage space issues (e.g., "no space left on device" errors), etc. One reason for backup failure is the unexpected consumption of available storage capacity.

This in turn impacts storage system reliability, customer relations, and business operations as well as brand reputation.

Consider, as an example, a storage backup system (e.g., a Dell EMC Data Domain or Dell EMC PowerProtect DD system or environment) where over a period of 6 days, there are 3,315 storage arrays or storage systems whose capacity has exceeded more than 90% (for a total of 101,934 storage systems sharing Auto Support (ASUP) data). In this example, around 3.25% of storage systems have capacity which reached more than 90%. This implies that capacity forecasting engines of the backup system, which may use segmented regression, are not able to accurately predict capacity for the 3.25% of the storage systems whose capacity reached more than 90%. This also implies that users (e.g., storage administrators) failed to take proactive action to free up the space, which can lead to 100% space usage on such storage systems and resulting failures in backup operations.

Illustrative embodiments provide techniques for overcoming such issues related to storage becoming full in backup systems, by providing a storage environment backup service (e.g., the storage environment backup service 112 of FIG. 1). The storage environment backup service in some embodiments is utilized for a backup system that utilizes deduplication-based storage systems. The storage environment backup service is configured to identify "cold" data and implement adaptive policy-enforcing mechanisms. The storage environment backup service provides a prescriptive analytics solution which thrives on characterizing historical data to make smart decisions into the future. The storage environment backup service in some embodiments predicts storage consumption (e.g., of deduplication-based storage systems) some number n of days ahead. The value of n may be user-defined, and may be based on a worst-case time for procuring additional storage resources.

Depending on the predicted storage consumption value, the storage environment backup service is configured to perform proactive measures to help counter storage becoming full on the storage systems utilized by the backup system. Such proactive measures may include rule-based migration of "unique cold data" on storage systems utilized in the backup system (e.g., a unique approach to freeing up storage space on deduplication-based backup systems). The storage environment backup service may utilize adaptive policy-enforcing mechanisms for performing automatic and dynamic resource allocation for data movement and garbage collection processes based on predicted storage capacity probability values to free up storage space (e.g., on an active tier) as fast as possible. Such proactive measures may also include requesting or procuring additional storage resources (e.g., notifying sales teams or other authorized users to ship or deploy additional storage to end-users that are predicted to run out of storage space).

The storage environment backup service, in some embodiments, performs multiple proactive measures to help end-users avoid any service interruptions that might result from storage becoming full on the storage systems utilized in a backup system. Thus, the storage environment backup service provides improvements in backup systems and associated storage systems through reducing downtime and errors, enabling more efficient utilization of storage space, etc. The storage environment backup service in some embodiments uses a unique method for freeing up space on deduplication-based backup systems as fast as possible. In addition to the various improvements to the functioning of storage systems, the storage environment backup service can also lead to an increased end-user satisfaction index, thus meeting the need for a tool that proactively handles issues related to storage becoming full on backup systems.

Figure 3:
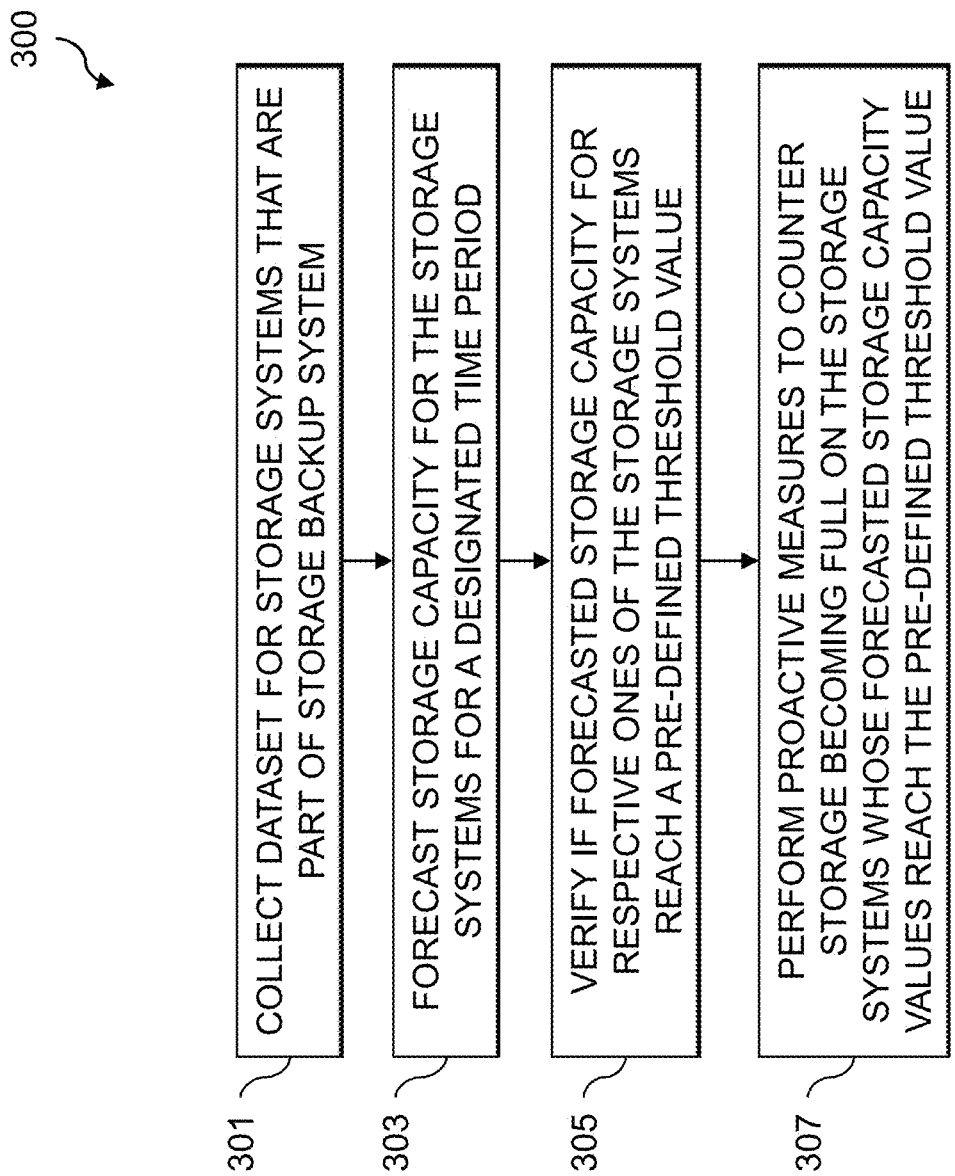
FIG. 3 shows a process flow for forecasting storage consumption and performing proactive measures to counter storage becoming full based on the forecasted storage consumption in an illustrative embodiment.

Use of the storage environment backup service in a backup system comprising deduplication-based storage systems will now be described. Functionality of the storage environment backup service will be described below with respect to two phases, a first phase in which the storage environment backup service forecasts n days ahead storage consumption on the storage systems in the backup system and a second phase in which the storage environment backup service performs proactive measures to counter storage becoming full in the storage systems of the backup system. FIG. 3 shows an overall flow 300 of the solution. The flow 300 begins with collecting a dataset for storage systems that are part of a storage backup system in step 301. Storage capacity is then forecasted in step 303 for the storage systems for a designated time period. In step 305, verification of whether the forecasted storage capacity for respective ones of the storage systems reach a pre-defined threshold value (e.g., within the designated time period). Proactive measures are performed in step 307 to counter storage becoming full on the storage systems whose forecasted storage capacity values reach the pre-defined threshold value.

Figure 4:
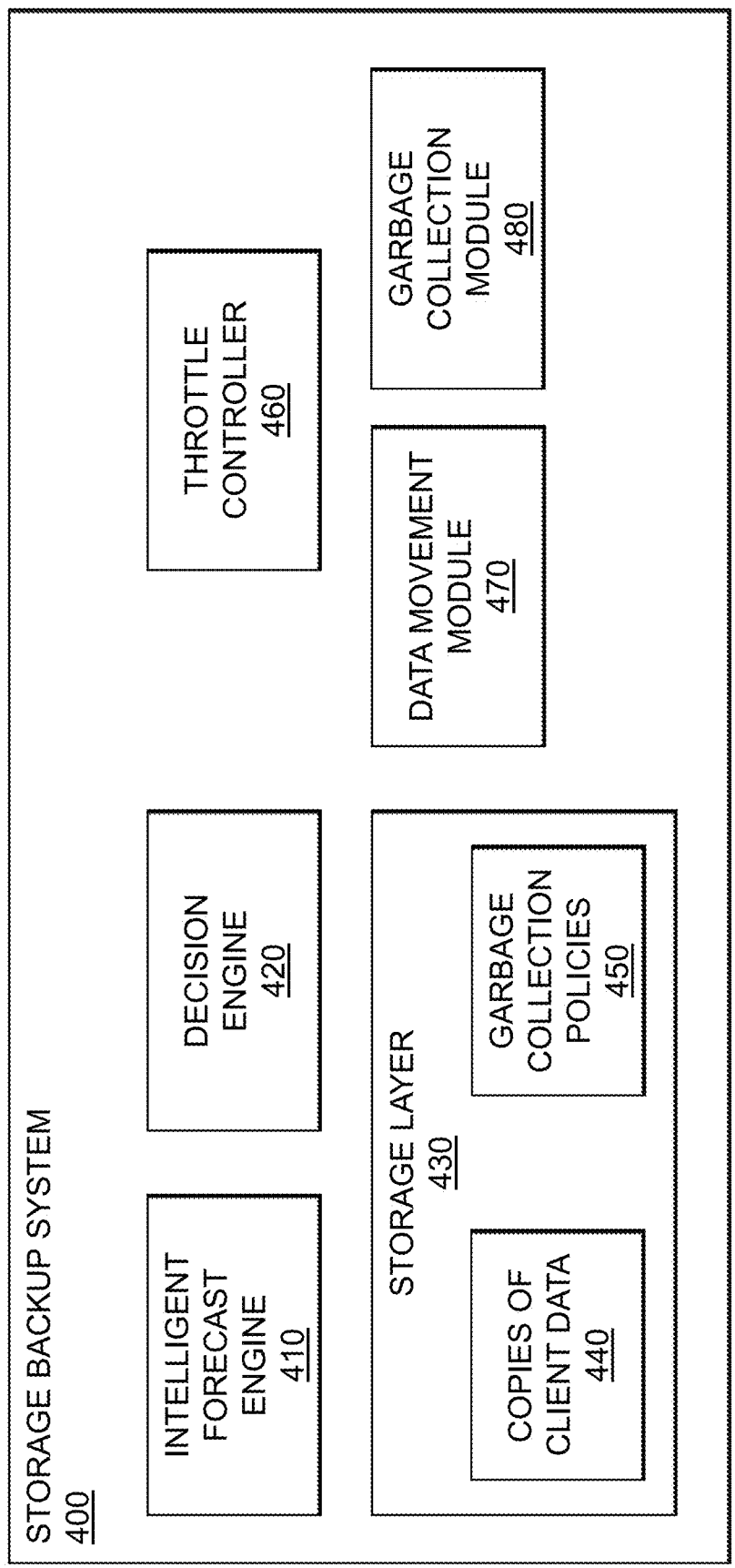
FIG. 4 shows an example of a storage backup system configured with an intelligent forecast engine and decision engine in an illustrative embodiment.
Figure 5A:
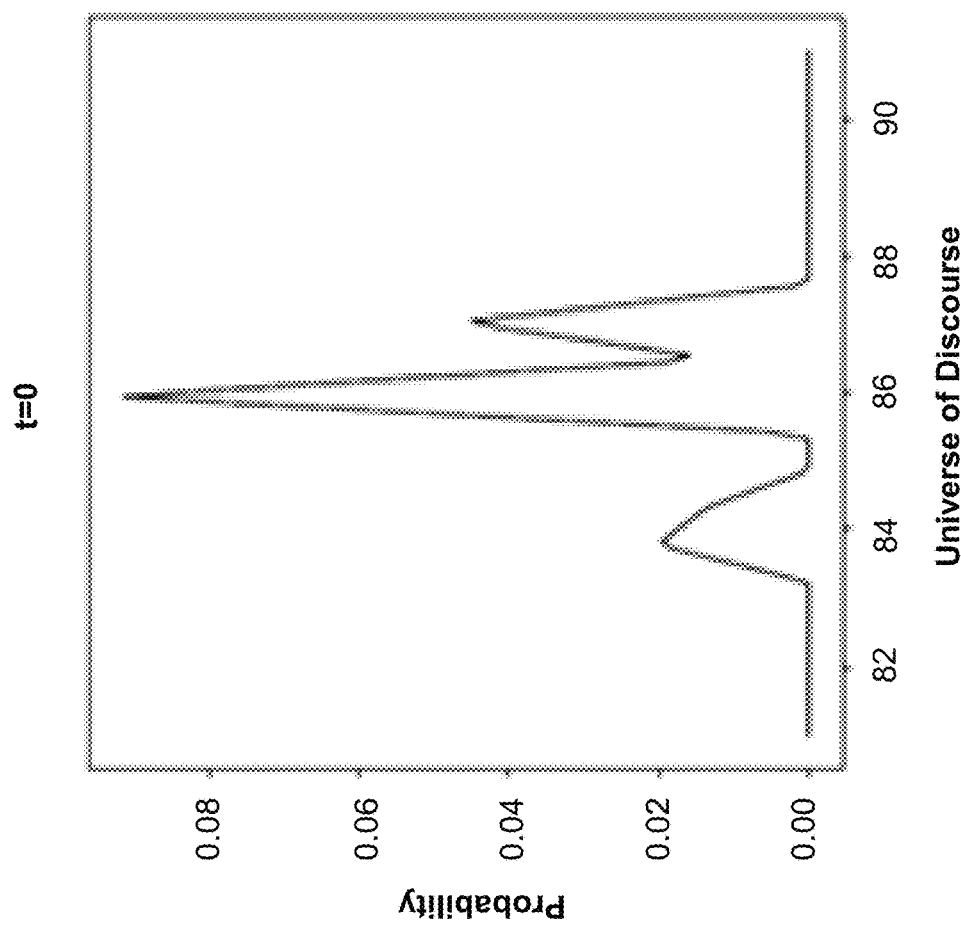
FIGS. 5A-5G show plots of probabilistic forecasting results for a sample dataset in an illustrative embodiment.
Figure 5B:
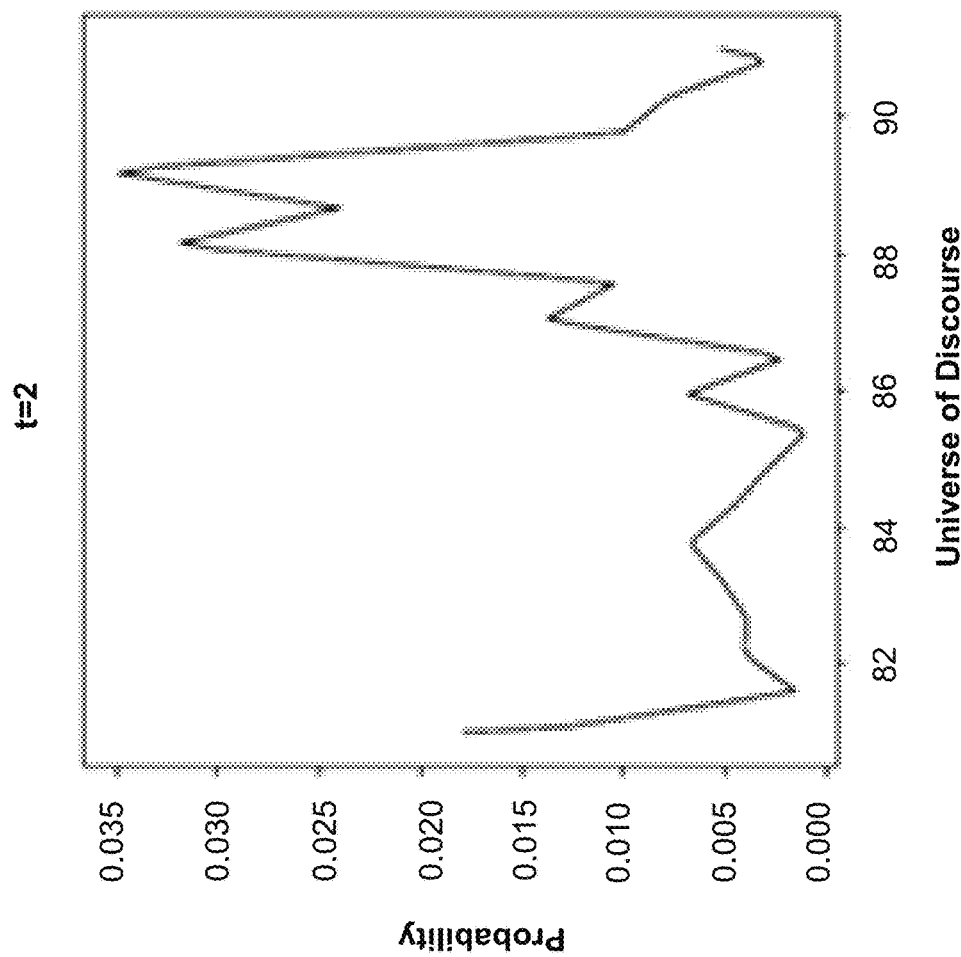
Figure 5C:
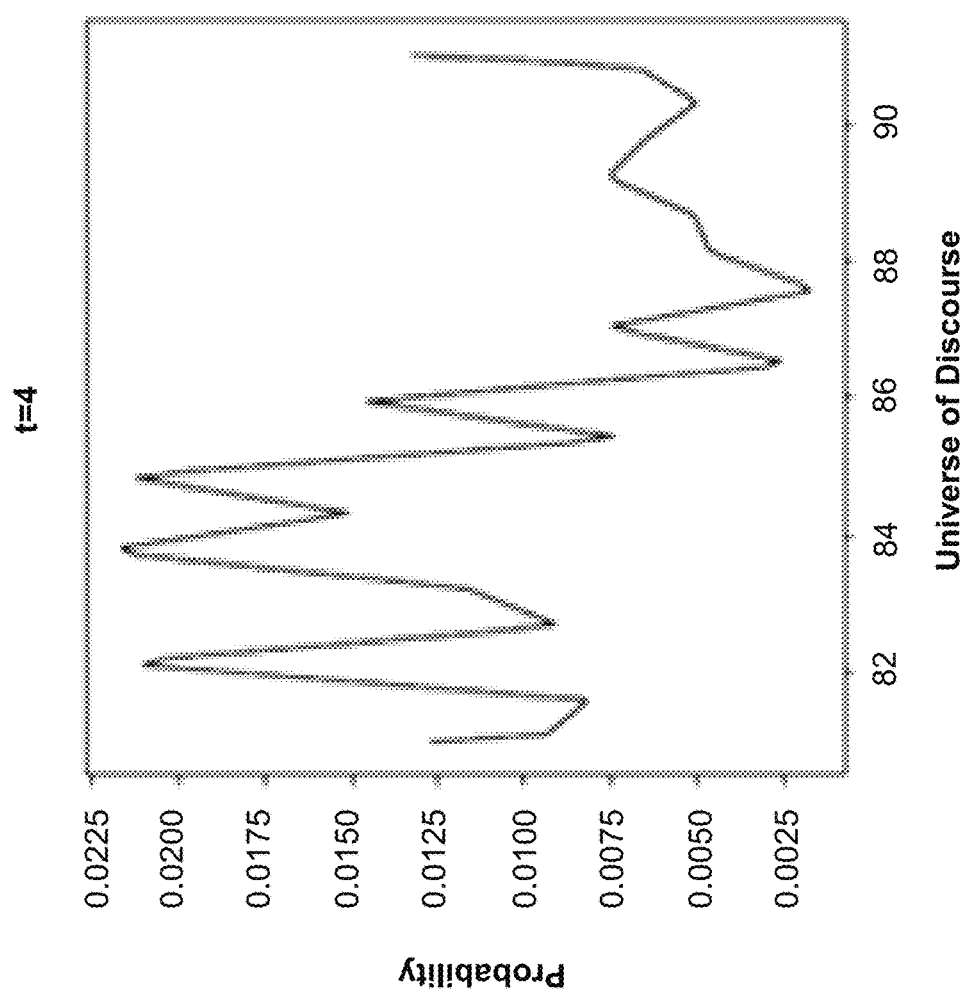
Figure 5D:
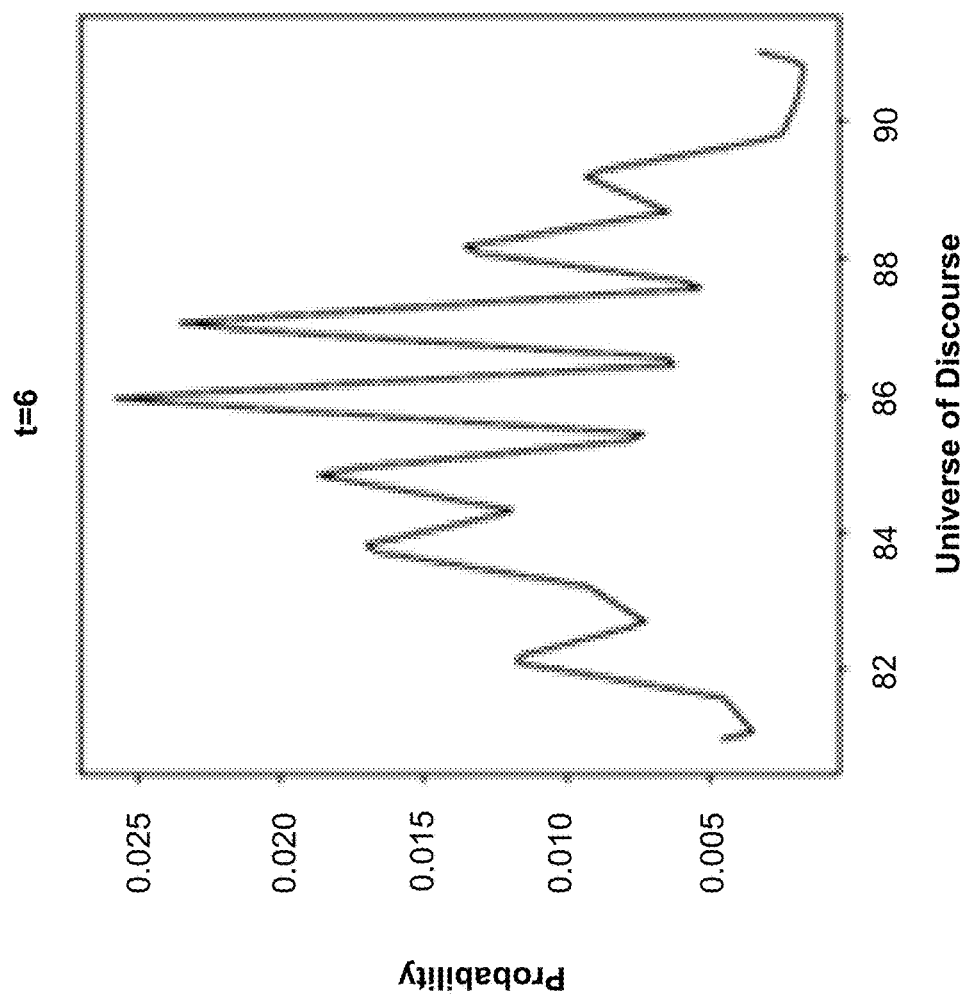
Figure 5E:
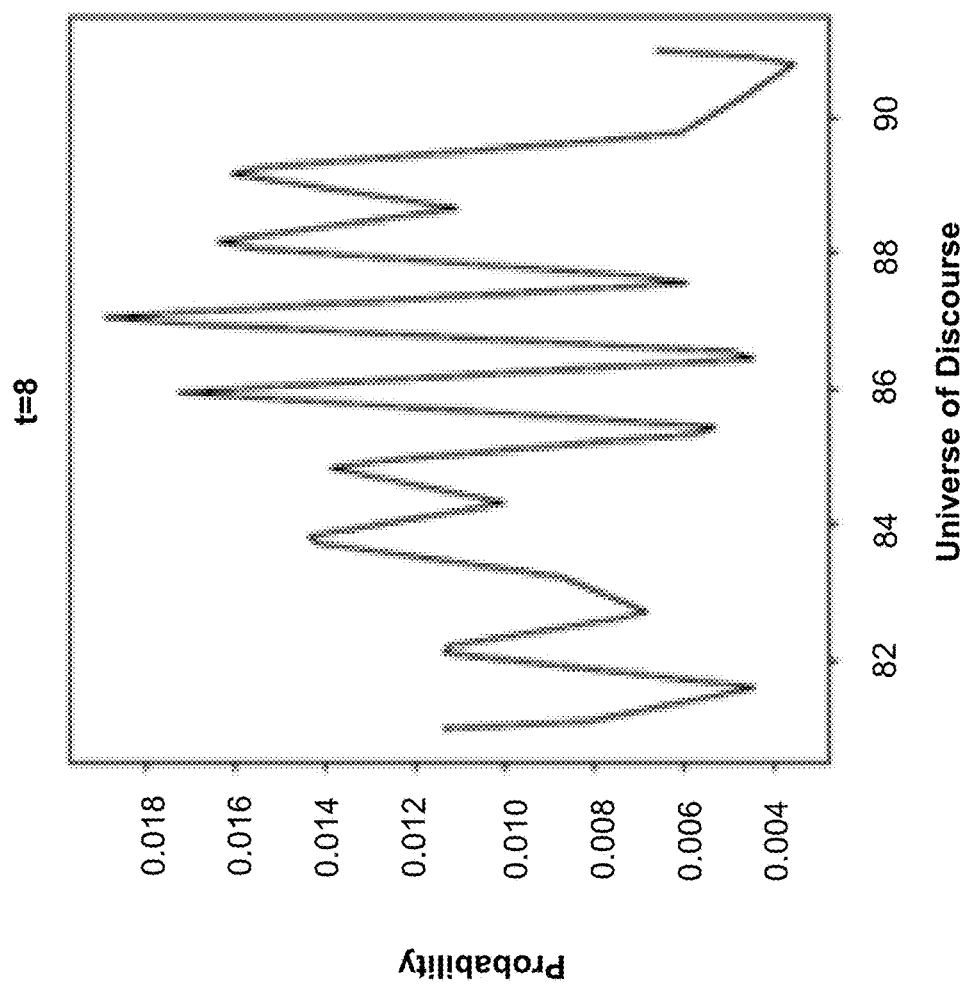
Figure 5F:
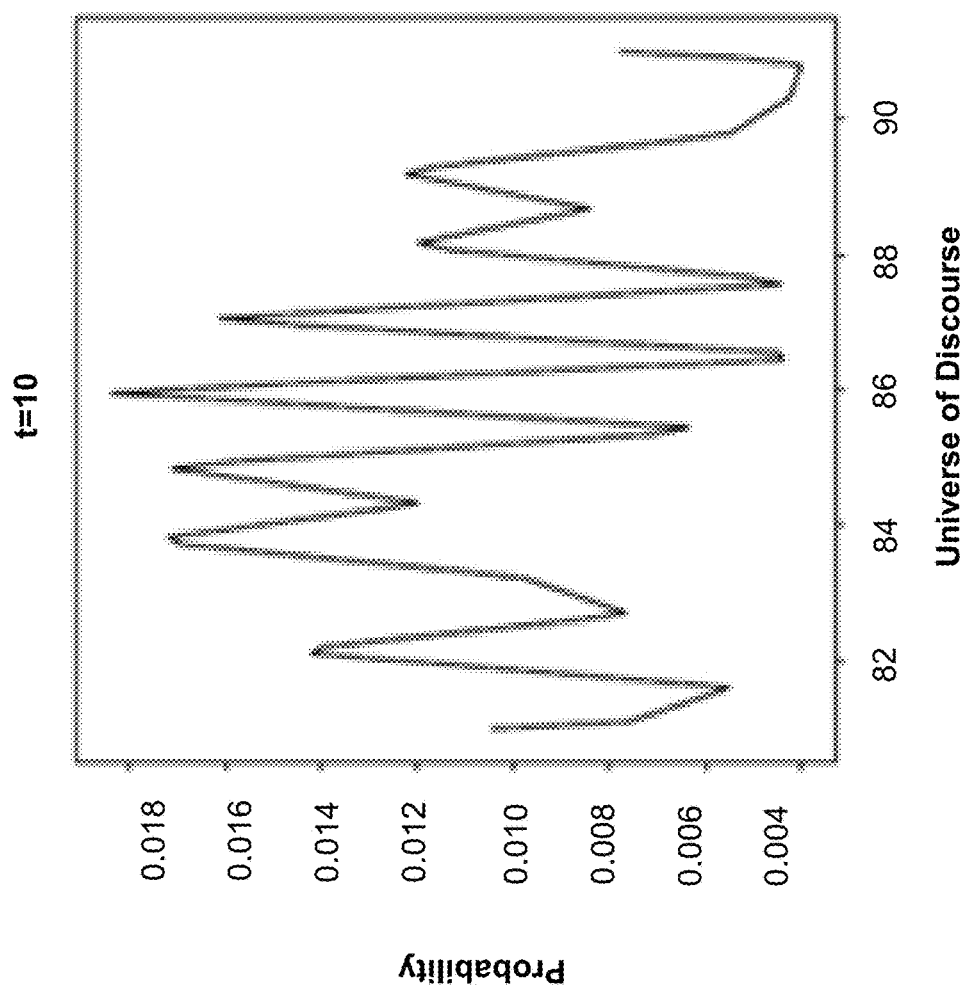
Figure 5G:
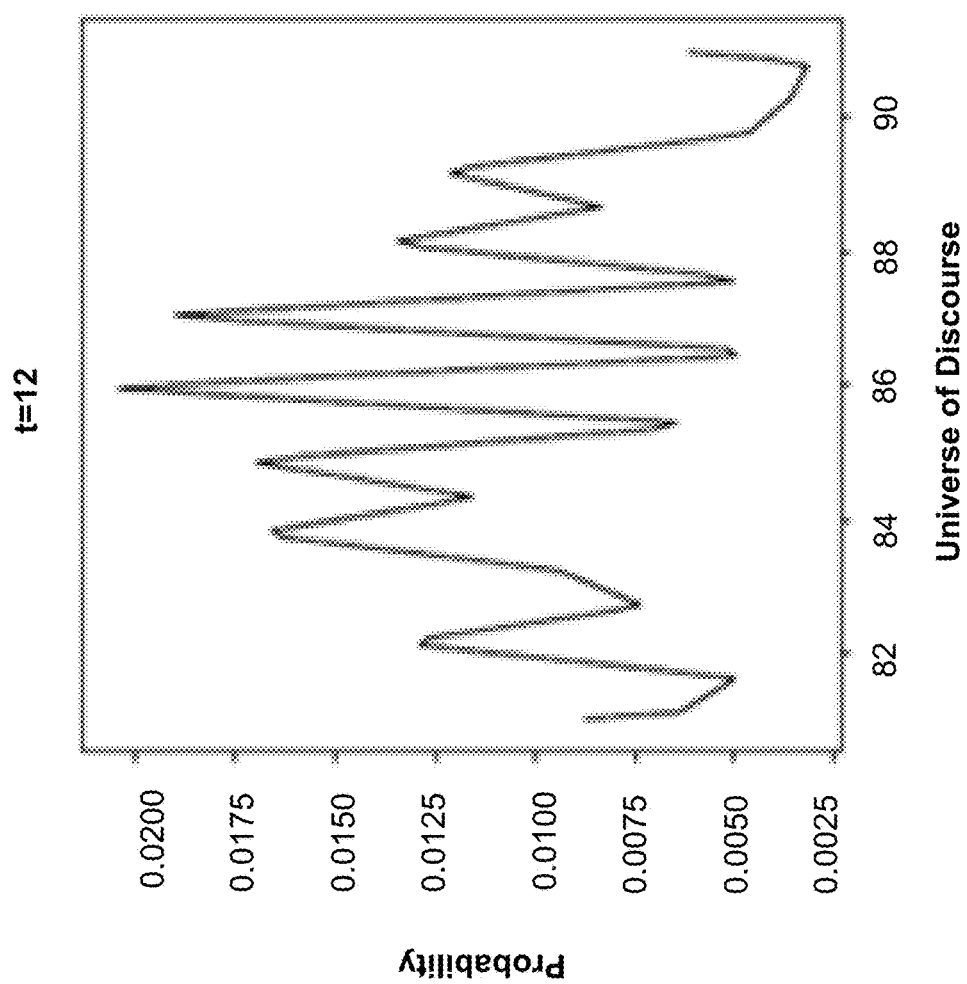

FIG. 4 shows an example implementation of a storage backup system 400, which may comprise a suitably modified Data Domain system or environment. In a Data Domain system, ASUP may provide a centralized database to which the field Data Domain systems (e.g., storage arrays or other storage systems) are configured to send support bundles. The storage backup system 400, as illustrated in FIG. 4, includes an intelligent forecast engine 410 that is configured to perform forecasting of storage consumption on storage systems utilized in the storage backup system or environment. The storage backup system 400 also includes a decision engine 420 that is configured to determine what proactive measures, if any, to take in response to the forecasts produced by the intelligent forecast engine 410. The storage backup system 400 further includes a storage layer 430 that includes copies of client data (e.g., backups) 440 as well as garbage collection policies 450. As will be described in further detail below, the storage backup system 400 also includes a throttle controller 460 configured to dynamically assign resources for data movement processes implemented using a data movement module 470 and for garbage collection processes implemented using a garbage collection module 480.

The storage environment backup service may be implemented within the storage backup system 400 through the intelligent forecast engine 410 and decision engine 420. The storage environment backup service provides a proactive solution to counter "storage full" issues on backup systems such as the storage backup system 400 of FIG. 4. This proactive solution is based on the predictions of n days ahead storage consumption by storage systems produced by the intelligent forecast engine 410. In some embodiments, the intelligent forecast engine 410 utilizes a PWFTS algorithm for forecasting. The PWFTS forecasting algorithm advantageously outperforms other types of forecasting algorithms such as segmented regression forecasting algorithms. In addition, the adaptive policy-enforcing mechanism utilized by the storage environment backup service to dynamically assign resources for various system operations (e.g., garbage collection, data movement, etc.) utilizes probability values of forecasted storage capacity. The PWFTS forecasting algorithm advantageously provides such probability values. The probability values produced using the PWFTS forecasting algorithm may also be used to obtain point forecasts required for performing proactive remediation measures. Although some embodiments are described with respect to use of the PWFTS forecasting algorithm, it should be appreciated that other types of forecasting algorithms may be utilized.

Figure 6:
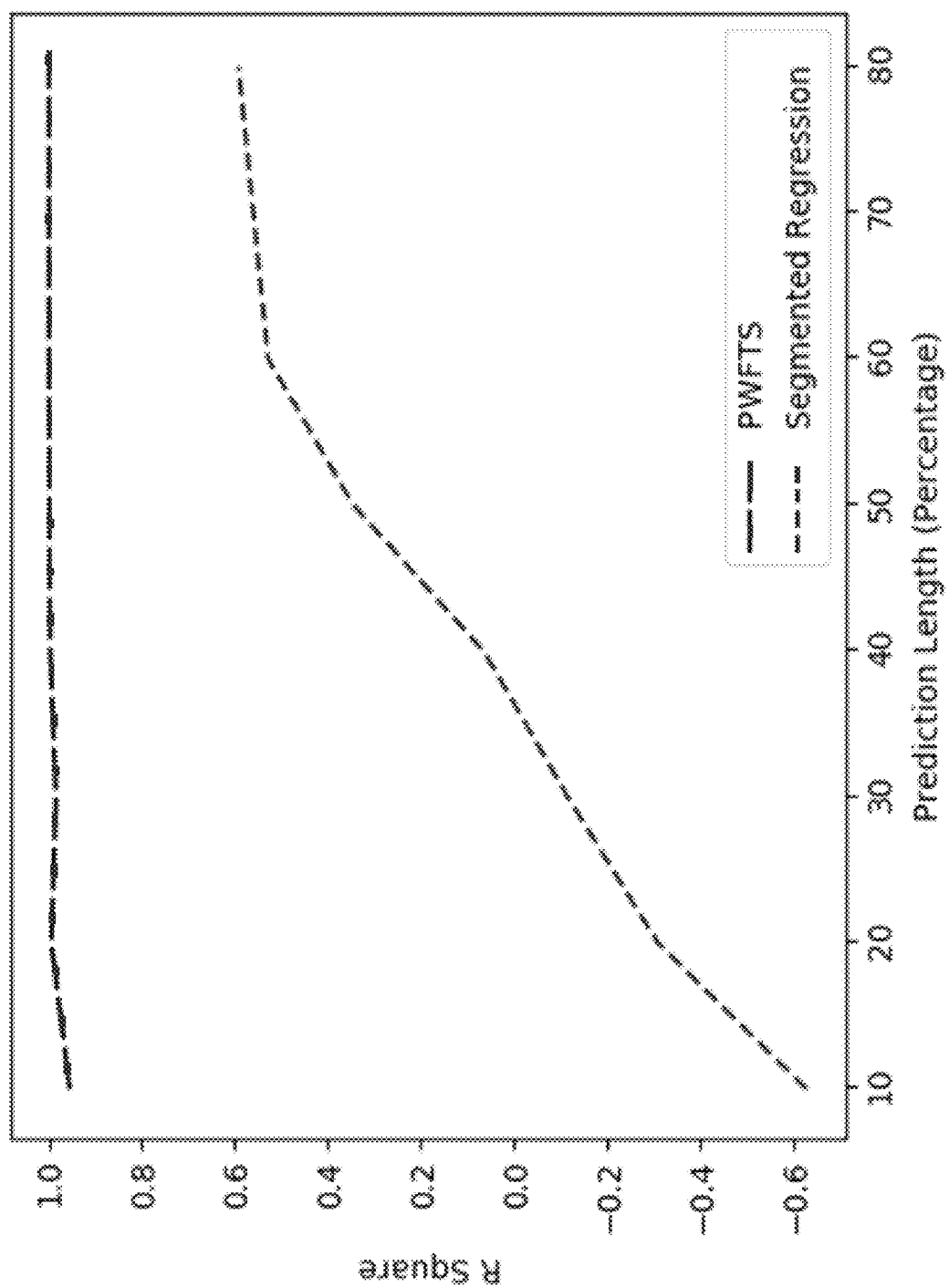
FIG. 6 shows a plot comparing performance of different forecasting results for a sample dataset in an illustrative embodiment.

FIGS. 5A-5G show plots of probabilistic forecasting results for a sample dataset of logs provided to an ASUP database that characterizes storage consumption on an active tier for 60 days, using PWFTS. Each of the plots of FIGS. 5A-5G has a y-axis representing probability and an x-axis representing the universe of discourse. The plots of FIGS. 5A-5G are associated with different values of "t" (e.g., t=0, 2, 4, 6, 8, 10, 12) representing the number of days ahead forecasting. It should be appreciated, however, that various other values of "t" may be used as desired. FIG. 6 shows a plot comparing performance for t–12 (e.g., 12-days ahead forecasting) using PWFTS with segmented regression. As illustrated in the FIG. 6 plot, PWFTS outperforms segmented regression forecasting for the sample dataset.

The decision engine 420 of the storage backup system 400, as noted above, is configured to utilize forecasts produced by the intelligent forecast engine 410 to identify proactive measures for countering or preventing storage becoming full in storage systems utilized by the storage backup system 400. In some embodiments, the decision engine 420 is configured with multiple threshold values, and depending on which threshold values are reached by the forecasted storage consumption values, different proactive measures are identified and recommended by the decision engine 420. Consider, as an example, an embodiment where the decision engine 420 is configured with two threshold values, a first threshold value $TH_1$ of 85% and a second threshold value $TH_2$ of 90%. When the forecasted storage consumption value for a given storage system reaches $TH_1=85\%$, the decision engine 420 may generate a notification that is sent to an end-user or an authorized user (e.g., a storage administrator, a sales team) which may dispatch additional storage resources (e.g., additional storage devices) to the end-user. When the forecasted storage consumption value for the given storage system reaches $TH_2=90\%$, the decision engine 420 may perform one or both of: (1) identifying and migrating "unique cold data" from an active tier to a cloud tier; and (2) overriding garbage collection policies and running a garbage collection process.

It should be appreciated that the particular values of the thresholds $TH_1$ and $TH_2$ may vary as desired, and are not limited to 85% and 90%, respectively. Further, the decision engine 420 may be configured with more than two thresholds. In another embodiment, the decision engine 420 may be configured with four thresholds $TH_1$-$TH_4$ (e.g., where $TH_1<TH_2<TH_3<TH_4$) that trigger different proactive measures. With four thresholds, the given storage system reaching $TH_4$ may trigger generation and delivery of a notification to the end-user while $TH_2$ triggers generation and delivery of a notification to an authorized user such as a storage administrator or sales team to dispatch additional storage resources to the end-user. The given storage system reaching $TH_3$ may trigger identifying and migrating the "unique cold data" from the active tier to the cloud tier, while the given storage system reaching $TH_4$ may trigger override of garbage collection policies such that garbage collection processes are run. Various other combinations of thresholds and associated proactive measures may be used in other embodiments.

Figure 7:
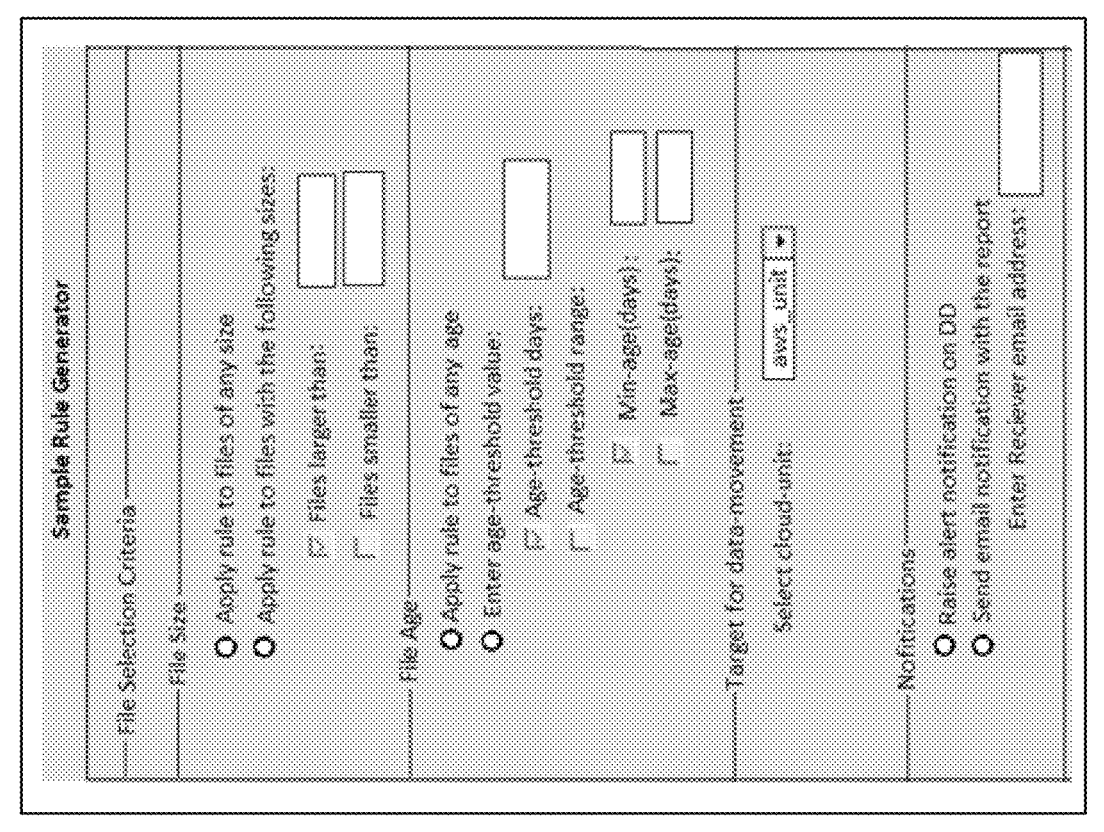

Additional details regarding proactive measures for identifying and migrating "unique cold data" from an active tier to a cloud tier will now be described. Cold data may be classified into two types, cold data that is never accessed and cold data that is infrequently accessed. Here, the case of "never accessed" data is considered. The decision engine 420 of the storage backup system 400 may implement a rule generator that enables end-users to configure rules as per their requirements such that the decision engine 420 is able to identify cold data on the storage systems utilized by the storage backup system 400. FIG. 7 shows an example implementation of a rule generator interface. The sample rule generator enables various file selection criteria, including criteria associated with file size and file age, as well as a target for data movement and notification settings. To identify cold data on the backup system, file attributes such as file creation time and file modification time are analyzed. FIG. 8 shows pseudocode which may be used to identify cold data.

In some cases, a customer or end-user may define service level agreements (SLAs) for long-term retention of particular data on an active tier of a backup system. Data with an SLA defined for long-term retention on the active tier may be excluded from consideration (e.g., such data will not be identified as cold data even if it otherwise meets the conditions for identifying cold data). Consider, as an example, a Retention Lock (RL) that is set on an mtree (e.g., a logical partition of a file system in Data Domain) for a defined time period (e.g., five years). This implies that, for the five-year time period, no file or data in the specified mtree should be removed, deleted or modified, depending on the type of retention lock that is set. In Data Domain, if the end-user does not plan to tier particular data to a cloud tier and if there is a requirement to store that data in an active tier for a long period of time (e.g., 5-10 years), this may be specified in one or more SLAs using a RL. The decision engine 420 of the storage backup system 400 may exclude any such data that has an SLA defined for long-term retention on the active tier from being identified as cold data.

Figure 9:
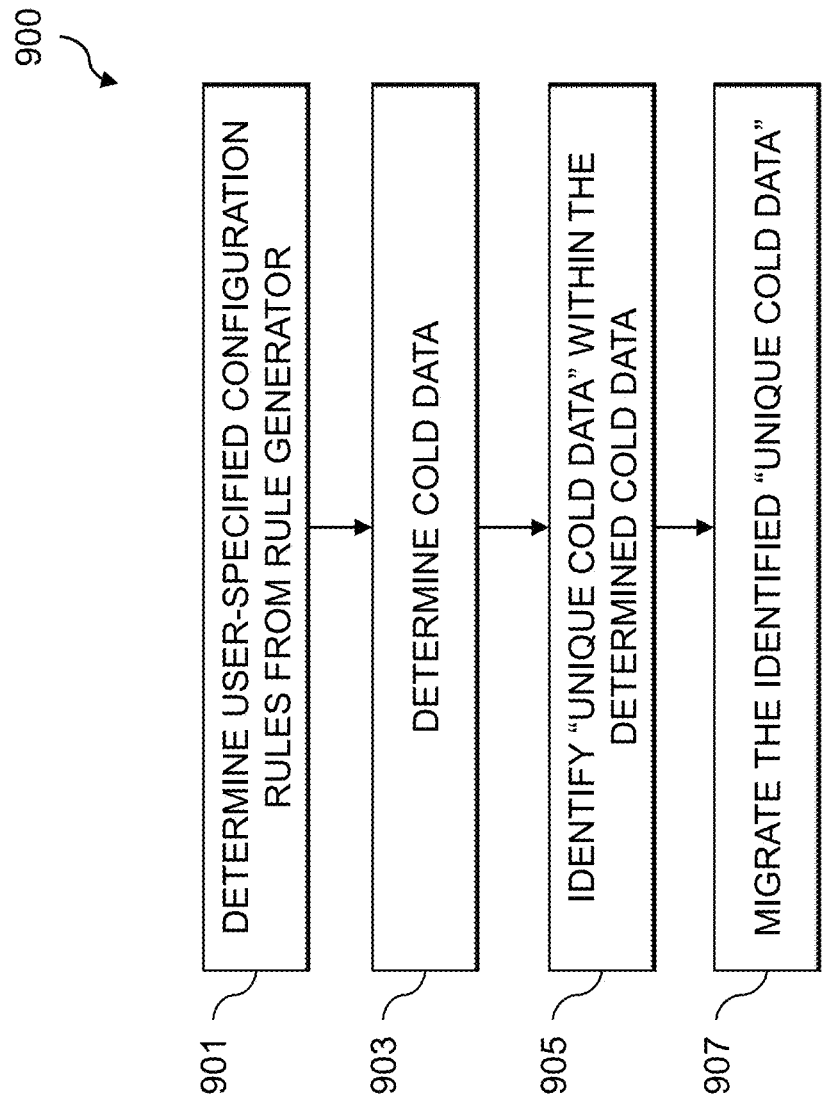
FIG. 9 shows a process flow for identifying unique cold data within cold data of a storage backup system in an illustrative embodiment.

Once the decision engine 420 of the storage backup system 400 identifies the cold data on the backup system, the decision engine will further identify "unique" data out of all the cold data that is identified. Such data is output as a list of "unique cold data" on the storage backup system 400. The unique cold data may be identified by listing down the fingerprints (FPs) of all segments which form a given file, comparing these FPs with all other files, and if all the FPs are unique, then the given file represents a "unique" file. This process is illustrated in the process flow 900 of FIG. 9. In step 901, user-specific configuration rules are determined from a rule generator (e.g., as specified using the rule generator interface of FIG. 7). In step 903, cold data of the storage backup system is determined (e.g., using the pseudocode of FIG. 8). Next, unique cold data is identified within the determined cold data in step 905. The identified unique cold data is then migrated in step 907.

The identified "unique cold data" may be migrated to a cloud tier (e.g., cloud-based storage 118). A final list of the "unique cold data" identified on the storage backup system 400 is migrated to the cloud tier, assuming that the end-user has a cloud tier configured in the storage backup system 400. If the end-user does not have a cloud tier configured, the end-user may be prompted to do so, or to otherwise specify a backup or non-active tier to which the unique cold data should be migrated. The decision engine 420 of the storage backup system 400 may automatically create a data movement policy for data migration of the "unique cold data" to the cloud tier. Because the data migration of the "unique cold data" is performed as a proactive measure to counter storage becoming full in the storage backup system 400, there is a need for an intelligent way of handling the data movement process so that data can be freed up on the active tier as fast as possible. In conventional data movement operations, a user may need to assign resources manually (e.g., including manually setting a throttle value) and such settings are typically static. In other words, whenever data movement operations happen, they utilize the same throttle value (e.g., a percentage of system resources assigned). This has the drawbacks of not being dynamic and not taking into account current needs.

In some embodiments, an adaptive policy-enforcing mechanism is used to enable more efficient data movement operations for freeing up data on an active tier (e.g., by migrating "unique cold data" from the active tier to a cloud tier). The adaptive policy-enforcing mechanism performs automatic and dynamic resource allocation to data movement processes based on predicted storage capacity probability values. This advantageously speeds up data movement processes. The probability values of forecasted storage capacity (e.g., as provided using a PWFTS forecasting algorithm as described above) are used to dynamically adjust resource allocation to data movement processes (e.g., along a continuous spectrum). Let the initial throttle value (e.g., a percentage of resources assigned) set for the data movement process be raw. Based on how large the current storage capacity forecasted probability value is, the throttle value is increased by a factor of $X_{DM}$ to speed up the data movement operation. Hence, the new throttle value is $X_{DM}*r_{DM}$. It should be noted that $X_{DM}$ is dynamically set, and thus may be a changing value along some continuous or discrete spectrum.

Figure 10:
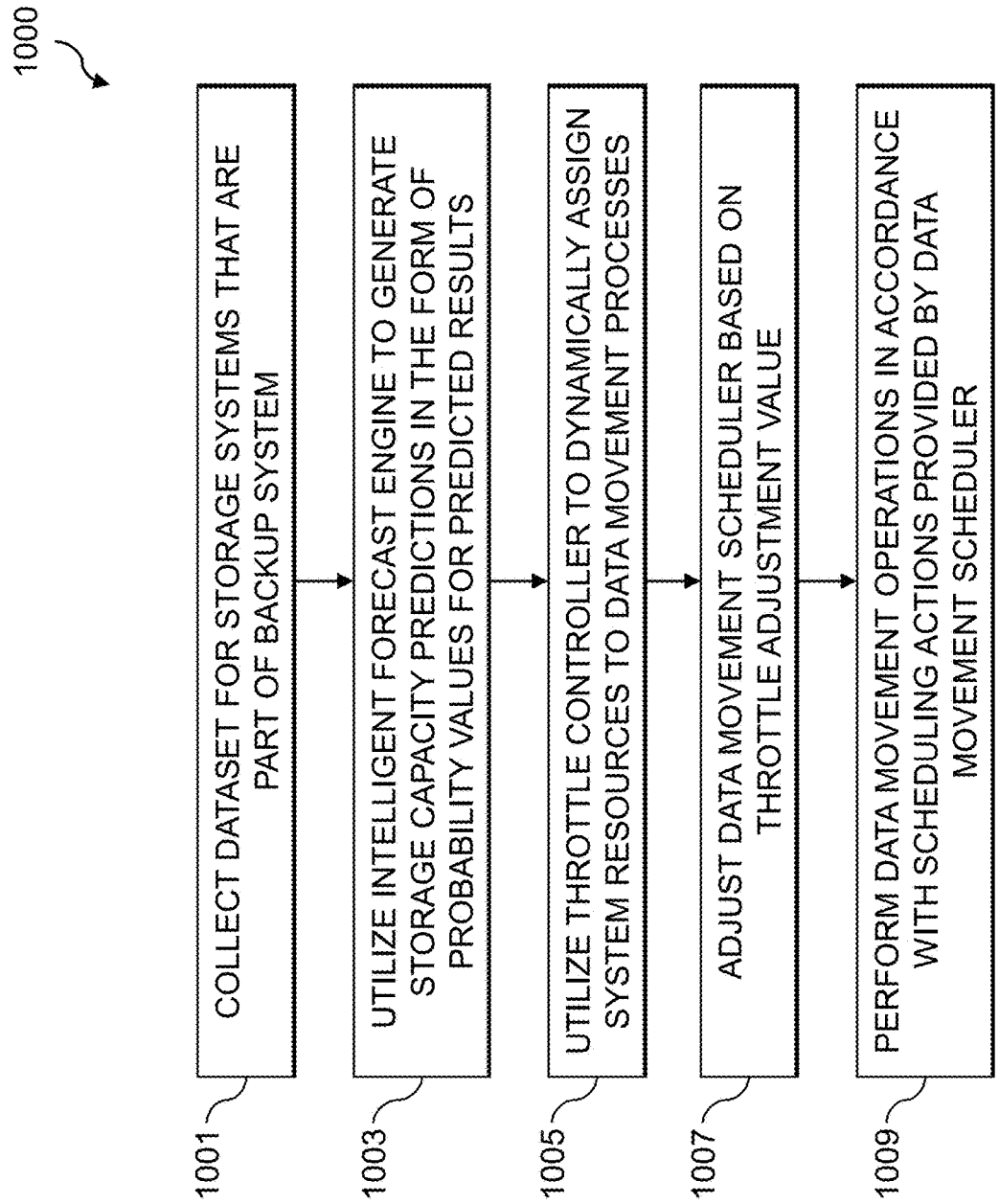
FIG. 10 shows a process flow for implementing an adaptive policy-enforcing mechanism in data movement processes of a storage backup system in an illustrative embodiment.

FIG. 10 shows a process flow 1000 for implementing an adaptive policy-enforcing mechanism in data movement processes. In step 1001, a dataset for storage systems that are part of the storage backup system 400 is collected. The dataset may be collected, in some embodiments, from a support database (e.g., an ASUP database). The dataset is provided to the intelligent forecast engine 410 of the storage backup system 400, which generates storage capacity predictions in step 1003. The storage capacity predictions are illustratively in the form of probability values for predicted results. The predicted results, in the form of probability values, are provided to the throttle controller 460 of the storage backup system 400 that dynamically assigns system resources (e.g., compute, storage and network resources) to the data movement module 470 which implements data movement processes for the storage backup system 400 in step 1005. The throttle controller 460 will compute a throttle adjustment value $X_{DM}$ for the data movement process as described above, and provide the new throttle adjustment value $X_{DM}$ to a data movement scheduler implemented by the data movement module 470. The data movement scheduler will adjust data movement schedules based on the throttle adjustment value $X_{DM}$ in step 1007, and the adjusted scheduling actions are used to control data movement operations in step 1009. The "unique cold data" is then migrated with the data movement operations.

In some embodiments, the decision engine 420 of the storage backup system 400 overrides existing garbage collection policies 450 and runs garbage collection processes after performing data migration of the "unique cold data." The decision engine 420 may dynamically assign more resources to speed up the garbage collection processes so as to free up space on the active tier (e.g., as soon as possible). The decision engine 420 may use the unique adaptive policy-enforcing mechanism to dynamically assign resources to the garbage collection module 480 implementing the garbage collection processes. Let the initial throttle value (e.g., a percentage of resources assigned) for the garbage collection processes be $r_{GC}$. Based on how large the current storage capacity forecasted probability value is, the throttle value $r_{GC}$ is increased by a factor of $X_{GC}$ to speed up the garbage collection processes. Thus, the new throttle value for the garbage collection processes is $X_{GC}*r_{GC}$. $X_{GC}$, similar to $X_{DM}$, may be a changing value in a continuous or discrete spectrum.

Figure 11:
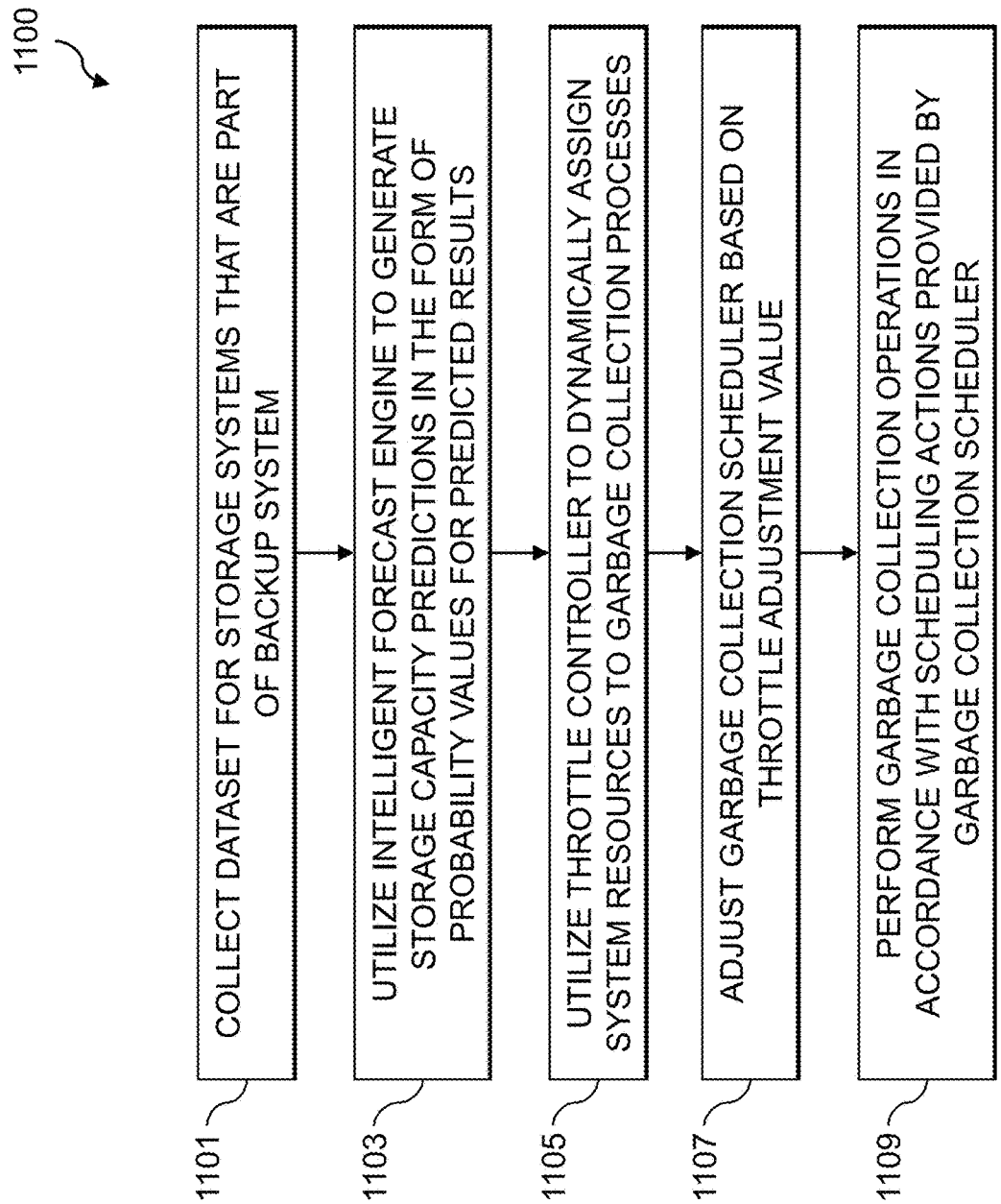
FIG. 11 shows a process flow for implementing an adaptive policy-enforcing mechanism in garbage collection processes of a storage backup system in an illustrative embodiment.

FIG. 11 shows a process flow 1100 for implementing the adaptive policy-enforcing mechanism in garbage collection processes. In step 1101, a dataset for storage systems that are part of the storage backup system 400 is collected. The dataset may be collected, in some embodiments, from a support database (e.g., an ASUP database). The dataset is provided to the intelligent forecast engine 410 of the storage backup system 400 in step 1103, and the intelligent forecast engine 410 generates storage capacity predictions. The storage capacity predictions are illustratively in the form of probability values, which are provided to the throttle controller 460 in step 1105 to dynamically assign system resources (e.g., compute, storage and network resources) to the garbage collection module 480 that implements garbage collection processes. The throttle controller 460 will compute a throttle adjustment value $X_{GC}$ for the garbage collection processes as described above, and provide the new throttle adjustment value $X_{GC}$ to a garbage collection scheduler of the garbage collection module 480. The garbage collection scheduler will adjust scheduled actions based on the throttle adjustment value $X_{GC}$ in step 1107, and the adjusted scheduling actions are used to control garbage collection operations. The garbage collection operations are then performed in step 1109.

Illustrative embodiments provide various advantages relative to conventional techniques. Generally, there can be various reasons for backup failures including "insufficient storage" or storage full errors. Addressing this issue, especially in deduplication-based backup storage systems, needs a carefully designed model and parameter selection. Forecasting storage consumption can help to take proactive remedial actions to avoid backup failures. Illustrative embodiments provide solutions which advantageously reduce the calculation time (as the solutions described are computationally cheap as compared to conventional techniques) and also simplify the calculation process with the addition of heuristic rules. The solutions described herein, for example, may require only five data points to forecast a next value. PWFTS and rule-based data movement of "unique cold data" are used.

Conventional approaches may perform tiering of cold data on deduplication-based backup systems to free up space on an active tier. In deduplication-based backup systems, data gets duplicated and hence finding and migrating only cold data may not free up enough space on the active tier, as the cold data may or may not be unique. To handle this problem, illustrative embodiments enable data migration of "unique cold data" to the cloud tier to counter storage capacity becoming full on deduplication-based backup systems. Illustrative embodiments also provide a unique adaptive policy-enforcing mechanism to perform automatic and dynamic resource allocation for data movement and garbage collection processes.

Conventional techniques fail to perform tiering of "unique cold data" as described herein. Conventional techniques further fail to provide adaptive policy-enforcing mechanisms that are based on predicted storage capacity values to speed up data movement and garbage collection processes which can eventually help to free up space on the active tier as soon as possible. Thus, the solutions described herein can counter storage becoming full on deduplication-based backup systems and prevent failure or errors during backup operations.

Some conventional techniques perform storage consumption forecasting. For example, machine learning techniques may be used for capacity planning, including running multiple algorithms to analyze various models for most accurate predictions. Although such an approach may give reasonable forecasting values, it is significantly more resource intensive (including when run on a cloud platform) as such an approach relies on running multiple algorithms on the same dataset and then selecting the algorithm which gives optimum accuracy. Other conventional approaches may utilize autoregressive (AR) and Monte Carlo simulations for time series forecasting. AR and related algorithms such as autoregressive moving average (ARMA), autoregressive integrated moving average (ARIMA), and seasonal ARIMA (SARIMA) use linear models and may give poor predictions when dealing with non-linear trends. Still other conventional techniques use a Bayesian approach for time series capacity forecasting, which is CPU-intensive for calculations relative to the techniques described herein. Further, choosing the prior requires caution otherwise the Bayesian approach can generate misleading results. Conventional techniques may also use parameters such as CPU usage, memory and storage consumption in a model to forecast growth trends for a storage system. The model may consider deduplication features of the storage system.

As detailed above, illustrative embodiments may utilize a PWFTS forecasting algorithm that provides probability values for each forecast, as compared with conventional techniques which may utilize segmented regression forecasting. The solutions described herein identify and perform proactive measures to counter storage becoming full issues on storage systems, where conventional techniques fail to identify and perform such proactive measures. Conventional techniques further fail to provide a way to identify and migrate "unique cold data" while the solutions described herein perform rule-based automatic migration of "unique cold data" (e.g., on deduplication-based storage systems). Conventional approaches also typically have static throttling of data movement and garbage collection processes which may delay freeing up storage space on an active tier. The solutions described herein, in contrast, introduce and utilize a unique adaptive policy-enforcing mechanism based on predicted probability values of storage capacity in order to perform automatic and dynamic resource allocation to data movement and garbage collection processes thereby freeing up storage space on the active tier as fast as possible. The solutions described herein also advantageously provide mechanisms for proactively generating notifications to end-users or other users (e.g., a storage administrator, a sales team, etc.) when storage is predicted to be full or over some designated threshold capacity. Such notifications may include recommendations for shipping or otherwise providing or allocating additional storage resources to the end-users.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating storage capacity forecasts for storage systems in an active tier of a storage environment, and for selecting and initiating remedial actions for preventing storage systems in the active tier of the storage environment from reaching designated storage capacity error conditions will now be described in greater detail with reference to FIGS. 12 and 13. Although described in the context of system 100, these platforms may also be used to implement at least portions of other information processing systems in other embodiments.

Figure 12:
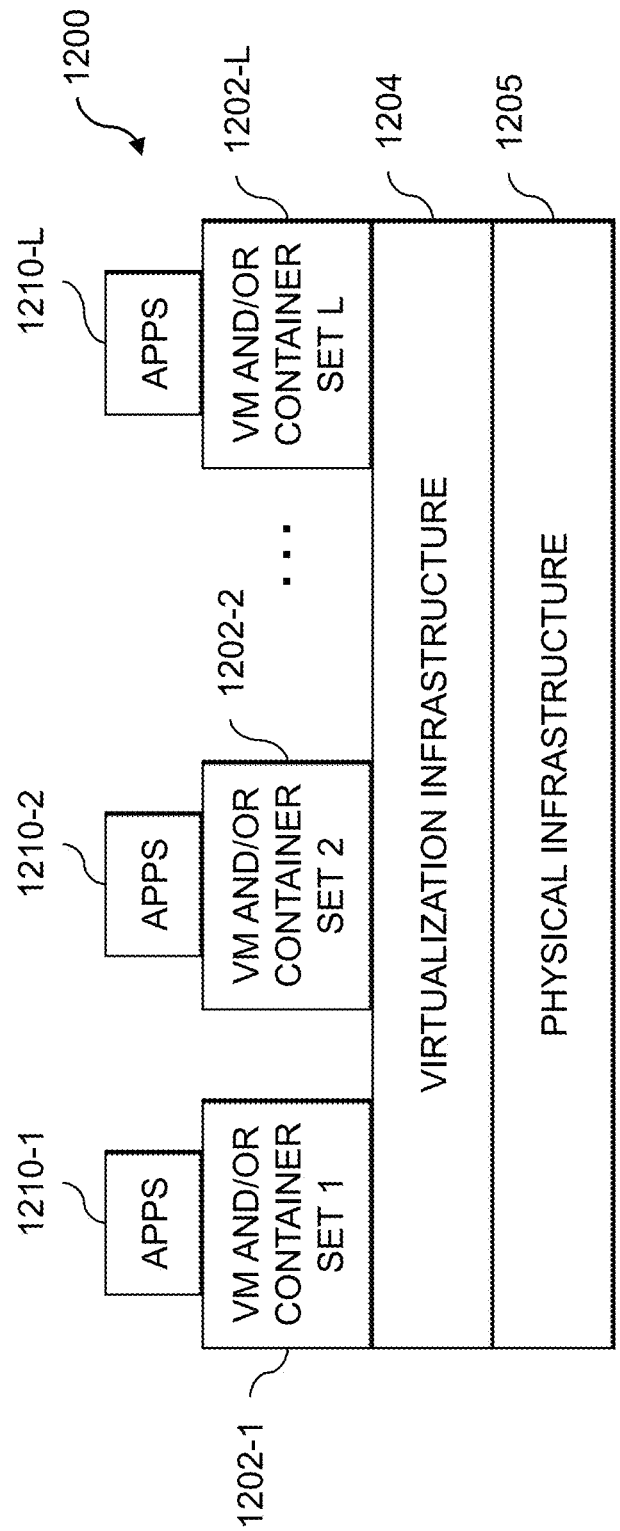
FIGS. 12 and 13 show examples of processing platforms that may be utilized to implement at least a portion of an information processing system in illustrative embodiments.
Figure 13:
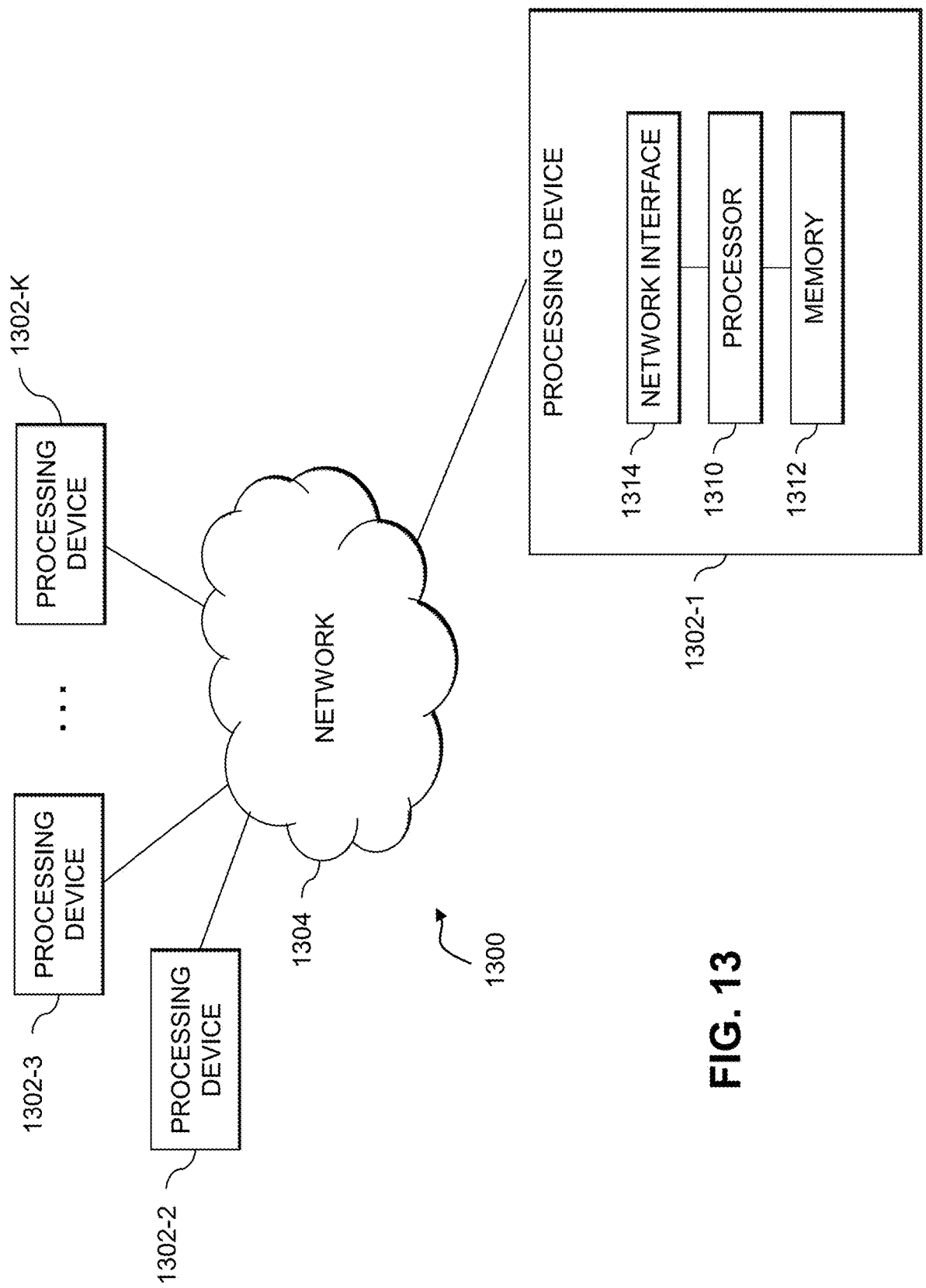

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating storage capacity forecasts for storage systems in an active tier of a storage environment, and for selecting and initiating remedial actions for preventing storage systems in the active tier of the storage environment from reaching designated storage capacity error conditions as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, forecasting algorithms, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        generating, for at least one storage system that is part of an active tier of a storage environment, at least one storage capacity forecast comprising probability values for storage capacity of the at least one storage system over a designated time period;
        determining whether any of the probability values for storage capacity of the at least one storage system over the designated time period exceed at least one designated storage capacity threshold; and
        responsive to determining that a given one of the probability values for storage capacity of the at least one storage system over the designated time period exceeds the at least one designated storage capacity threshold, selecting one or more remedial actions for freeing up space on the at least one storage system that is part of the active tier of the storage environment; and
        initiating the selected one or more remedial actions for freeing up space on the at least one storage system that is part of the active tier of the storage environment to prevent the at least one storage system from reaching a designated storage capacity error condition;
    wherein the at least one designated storage capacity threshold comprises one of a set of two or more storage capacity thresholds;
    wherein the selected one or more remedial actions comprises:
        a first type of remedial action responsive to the at least one designated storage capacity threshold being a first storage capacity threshold of the set of two or more storage capacity thresholds; and
        a second type of remedial action responsive to the at least one designated storage capacity threshold being a second storage capacity threshold of the set of two or more storage capacity thresholds; and
    wherein the first type of remedial action associated with the first storage capacity threshold comprises identifying and migrating a portion of data stored on the at least one storage system from the active tier of the storage environment to a cloud tier of the storage environment; and wherein the second type of remedial action associated with the second storage capacity threshold comprises overriding one or more garbage collection policies of the at least one storage system and initiating one or more garbage collection processes in the at least one storage system.

2. The apparatus of claim 1 wherein generating the at least one storage capacity forecast comprises utilizing a Probabilistic Weighted Fuzzy Time Series (PWFTS) algorithm.

3. The apparatus of claim 1 wherein the second storage capacity threshold exceeds the first storage capacity threshold.

4. The apparatus of claim 1 wherein the set of two or more storage capacity thresholds further comprises a third storage capacity threshold associated with a third type of remedial action and a fourth storage capacity threshold associated with a fourth type of remedial action, wherein the third type of remedial action associated with the third storage capacity threshold comprises generating and delivering a first notification to one or more end-users of the at least one storage system in the storage environment, and wherein the fourth type of remedial action associated with the fourth storage capacity threshold comprises generating and delivering a second notification to a storage administrator associated with the storage environment.

5. The apparatus of claim 4 wherein the fourth storage capacity threshold is less than the first storage capacity threshold and the third storage capacity threshold is less than the fourth storage capacity threshold.

6. The apparatus of claim 4 wherein the first notification comprises a predicted time at which the at least one storage system is expected to reach the designated storage capacity error condition, and wherein the second notification comprises a recommendation for deploying additional storage resources in the storage environment to prevent at least one storage system from reaching the designated storage capacity error condition.

7. The apparatus of claim 1 wherein identifying the portion of data stored on the at least one storage system comprises identifying one or more portions of data stored in the at least one storage system that meet one or more usage-based selection criteria.

8. The apparatus of claim 7 wherein the one or more usage-based selection criteria comprise user-specified criteria relating to at least one of file size and file age.

9. The apparatus of claim 7 wherein the one or more usage-based selection criteria comprises user-specified criteria relating to one or more service level agreements for retention of designated data on the active tier of the storage environment.

10. The apparatus of claim 7 wherein identifying the portions of data stored in the at least one storage system that meet the one or more usage-based selection criteria comprises selecting a subset of the data stored in the at least one storage system meeting the one or more usage-based selection, the selected subset of the data comprising unique files in the storage environment.

11. The apparatus of claim 1 wherein the first type of remedial action utilizes one or more data movement processes for migrating the portion of data stored on the at least one storage system from the active tier of the storage environment to the cloud tier of the storage environment, and wherein initiating the first type of remedial action comprises dynamically assigning resources to the one or more data movement processes based at least in part on the probability values for storage capacity of the at least one storage system over the designated time period.

12. The apparatus of claim 1 wherein initiating the second type of remedial action comprises dynamically assigning resources to the one or more garbage collection processes based at least in part on the probability values for storage capacity of the at least one storage system over the designated time period.

13. The apparatus of claim 1 wherein the storage environment comprises a deduplication-based storage backup environment.

14. A computer program product comprising a non-transitory processor-readable storage medium having stored therein program code of one or more software programs, wherein the program code when executed by at least one processing device causes the at least one processing device to perform steps of:
generating, for at least one storage system that is part of an active tier of a storage environment, at least one storage capacity forecast comprising probability values for storage capacity of the at least one storage system over a designated time period;
determining whether any of the probability values for storage capacity of the at least one storage system over the designated time period exceed at least one designated storage capacity threshold; and
responsive to determining that a given one of the probability values for storage capacity of the at least one storage system over the designated time period exceeds the at least one designated storage capacity threshold, selecting one or more remedial actions for freeing up space on the at least one storage system that is part of the active tier of the storage environment; and
initiating the selected one or more remedial actions for freeing up space on the at least one storage system that is part of the active tier of the storage environment to prevent the at least one storage system from reaching a designated storage capacity error condition;
wherein the at least one designated storage capacity threshold comprises one of a set of two or more storage capacity thresholds;
wherein the selected one or more remedial actions comprises:
a first type of remedial action responsive to the at least one designated storage capacity threshold being a first storage capacity threshold of the set of two or more storage capacity thresholds; and
a second type of remedial action responsive to the at least one designated storage capacity threshold being a second storage capacity threshold of the set of two or more storage capacity thresholds;
wherein the first type of remedial action associated with the first storage capacity threshold comprises identifying and migrating a portion of data stored on the at least one storage system from the active tier of the storage environment to a cloud tier of the storage environment; and
wherein the second type of remedial action associated with the second storage capacity threshold comprises overriding one or more garbage collection policies of the at least one storage system and initiating one or more garbage collection processes in the at least one storage system.

15. The computer program product of claim 14 wherein the first type of remedial action utilizes one or more data movement processes for migrating the portion of data stored on the at least one storage system from the active tier of the storage environment to the cloud tier of the storage environment, and wherein initiating the first type of remedial action comprises dynamically assigning resources to the one or more data movement processes based at least in part on the probability values for storage capacity of the at least one storage system over the designated time period.

16. The computer program product of claim 14 wherein initiating the second type of remedial action comprises dynamically assigning resources to the one or more garbage collection processes based at least in part on the probability values for storage capacity of the at least one storage system over the designated time period.

17. A method comprising:
generating, for at least one storage system that is part of an active tier of a storage environment, at least one storage capacity forecast comprising probability values for storage capacity of the at least one storage system over a designated time period;
determining whether any of the probability values for storage capacity of the at least one storage system over the designated time period exceed at least one designated storage capacity threshold; and
responsive to determining that a given one of the probability values for storage capacity of the at least one storage system over the designated time period exceeds the at least one designated storage capacity threshold, selecting one or more remedial actions for freeing up space on the at least one storage system that is part of the active tier of the storage environment; and
initiating the selected one or more remedial actions for freeing up space on the at least one storage system that is part of the active tier of the storage environment to prevent the at least one storage system from reaching a designated storage capacity error condition;
wherein the at least one designated storage capacity threshold comprises one of a set of two or more storage capacity thresholds;
wherein the selected one or more remedial actions comprises:
a first type of remedial action responsive to the at least one designated storage capacity threshold being a first storage capacity threshold of the set of two or more storage capacity thresholds; and
a second type of remedial action responsive to the at least one designated storage capacity threshold being a second storage capacity threshold of the set of two or more storage capacity thresholds;
wherein the first type of remedial action associated with the first storage capacity threshold comprises identifying and migrating a portion of data stored on the at least one storage system from the active tier of the storage environment to a cloud tier of the storage environment;
wherein the second type of remedial action associated with the second storage capacity threshold comprises overriding one or more garbage collection policies of the at least one storage system and initiating one or more garbage collection processes in the at least one storage system; and
wherein the method is performed by at least one processing device comprising a processor coupled to a memory.

18. The method of claim 17 wherein the first type of remedial action utilizes one or more data movement processes for migrating the portion of data stored on the at least one storage system from the active tier of the storage environment to the cloud tier of the storage environment, and wherein initiating the first type of remedial action comprises dynamically assigning resources to the one or more data movement processes based at least in part on the probability values for storage capacity of the at least one storage system over the designated time period.

19. The method of claim 17 wherein initiating the second type of remedial action comprises dynamically assigning resources to the one or more garbage collection processes based at least in part on the probability values for storage capacity of the at least one storage system over the designated time period.

20. The method of claim 17 wherein the second storage capacity threshold exceeds the first storage capacity threshold.

* * * * *